(12) United States Patent
Burton et al.

(10) Patent No.: US 11,365,110 B2
(45) Date of Patent: Jun. 21, 2022

(54) NON-INVASIVE ATTACHABLE SMART DEVICE HOUSING AND SMART DEVICE METHODS AND SYSTEMS FOR BEVERAGE CONTAINERS

(71) Applicant: Binary Beer Pty Ltd, North Wollongong (AU)

(72) Inventors: Michael Edwin Burton, North Wollongong (AU); Edward Ellis Esdaile-Watts, North Wollongong (AU)

(73) Assignee: BINARY BEER PTY LTD, North Wollongong (AU)

( * ) Notice: Subject to any disclaimer, the term of this patent is extended or adjusted under 35 U.S.C. 154(b) by 0 days.

(21) Appl. No.: 17/322,563

(22) Filed: May 17, 2021

(65) Prior Publication Data

US 2021/0354975 A1 Nov. 18, 2021

(30) Foreign Application Priority Data

May 18, 2020 (AU) .................................. 2020203218

(51) Int. Cl.
*B67D 1/08* (2006.01)
*B65D 25/20* (2006.01)
(Continued)

(52) U.S. Cl.
CPC .......... *B67D 1/0888* (2013.01); *B65D 25/205* (2013.01); *B67D 1/0801* (2013.01);
(Continued)

(58) Field of Classification Search
CPC .. B67D 1/0888; B67D 1/0878; B67D 1/0891; B67D 2001/0822; B67D 1/0801;
(Continued)

(56) References Cited

U.S. PATENT DOCUMENTS 3,921,948 A * 11/1975 Long ....................... A47F 7/283
248/220.41
4,951,839 A * 8/1990 Kong ...................... G01F 11/26
141/322

(Continued)

FOREIGN PATENT DOCUMENTS

DE 20219199 U1 3/2003
DE 102006026025 A1 12/2006
(Continued)

*Primary Examiner* — Frederick C Nicolas
(74) *Attorney, Agent, or Firm* — Miller Nash LLP

(57) ABSTRACT

Disclosed is a smart device housing configured to fixably attach to a beverage vessel having a domed surface at a distal end, the domed surface adjacent a wall terminating at a lip, the smart device housing including an exterior configured as a transformable shape enabling a locking fit between the lip and the domed surface of the beverage vessel. Also disclosed is a system wherein a smart device has at least one proximity, image or distance sensor having a beam of detection with a path, the sensor located and directed such the beam of detection covers a location where a coupler can be attached to the beverage vessel, the smart device configured to determine whether the coupler is attached to the beverage vessel by measuring whether the path is obstructed by the coupler. Also disclosed is a method of determining the fill status of a beverage container.

12 Claims, 13 Drawing Sheets

(51) Int. Cl.
*G01B 11/14* (2006.01)
*B67D 7/14* (2010.01)
*G01S 17/08* (2006.01)
*G06K 19/077* (2006.01)
*G01B 11/02* (2006.01)
*G06K 19/08* (2006.01)
*B65D 81/02* (2006.01)
*G16Y 20/10* (2020.01)
*H04W 4/02* (2018.01)
*H04W 4/80* (2018.01)

(52) U.S. Cl.
CPC ......... *B67D 1/0878* (2013.01); *B67D 1/0891* (2013.01); *B67D 7/145* (2013.01); *G01B 11/026* (2013.01); *G01B 11/14* (2013.01); *G01S 17/08* (2013.01); *G06K 19/07737* (2013.01); *G06K 19/08* (2013.01); *B65D 81/02* (2013.01); *B65D 2203/04* (2013.01); *B65D 2203/06* (2013.01); *B65D 2203/10* (2013.01); *B67D 1/0871* (2013.01); *B67D 2001/0811* (2013.01); *B67D 2001/0822* (2013.01); *G16Y 20/10* (2020.01); *H04W 4/02* (2013.01); *H04W 4/80* (2018.02)

(58) Field of Classification Search
CPC ................. B67D 7/145; B67D 1/0871; B67D 2001/0811; B65D 25/205; B65D 2203/10; B65D 81/02; B65D 2203/04; B65D 2203/06; G06K 19/08; G06K 19/07737; G01S 17/08; G01B 11/026; G01B 11/14; G16Y 20/10; H04W 4/02; H04W 4/80
See application file for complete search history.

(56) References Cited

U.S. PATENT DOCUMENTS

| | | | |
|---|---|---|---|
| 6,469,627 B1 | 10/2002 | Forster et al. | |
| 6,580,357 B1 | 6/2003 | Forster et al. | |
| 2004/0041709 A1* | 3/2004 | Forster | G06K 19/0717 340/603 |
| 2009/0206505 A1 | 8/2009 | Monzel et al. | |
| 2009/0258120 A1* | 10/2009 | Zeitler | B67D 1/0888 426/232 |
| 2016/0264394 A1* | 9/2016 | Hershberger | B67D 1/0855 |
| 2017/0297890 A1 | 10/2017 | Herlin | |
| 2017/0337496 A1* | 11/2017 | Jones | G06Q 10/08 |
| 2019/0025108 A1* | 1/2019 | Jones | G06Q 10/20 |
| 2020/0005112 A1* | 1/2020 | Ryan, Jr | G09F 3/02 |

FOREIGN PATENT DOCUMENTS

| | | |
|---|---|---|
| DE | 102007029095 A1 | 12/2008 |
| WO | 2017201544 A1 | 11/2017 |

* cited by examiner

Front view  Side view

Front view  Side view

NON-INVASIVE ATTACHABLE SMART DEVICE HOUSING AND SMART DEVICE METHODS AND SYSTEMS FOR BEVERAGE CONTAINERS

FIELD OF THE INVENTION

Disclosed are non-invasive attachable smart device housings and smart device methods and systems for beverage containers.

BACKGROUND OF THE INVENTION

Beverage containers such as beer kegs are commonly used in the food service industry. Beverage containers may be pressurised or not. Their common shape provides for standardised storage, transport, handling and connection to dispensing equipment. The sturdy structure of the beverage container allows it to be reused many times, cycling from production facilities to storage and distribution facilities, to food service outlets and back again without incurring critical damage.

SUMMARY OF THE INVENTION

An Internet of Things (IoT) device attached to a beverage container such as an RFID tag or smart device may, depending upon various disclosed features and methods, withstand the rigours of the supply chain, adhering securely to the beverage container by a means that does not compromise the integrity or function of the beverage container, so as to withstand jostling, collisions, loss or theft.

Smart devices used in various industries offer a wider range of features than the previous generation of electronic devices such as RFID and QR Codes that they replace. Smart devices commonly contain both wireless and optical identifications such as RFID transponders and QR codes in addition to their enhanced functionalities meaning that their shape and size can be inherently larger. The process of attaching RFID tags and Bluetooth Beacons, in particular, to beverage containers typically involves welding, drilling or chemical bonding (adhesive or stickers) and each of these methods may have their own drawbacks. Welding typically necessitates large, expensive equipment and skilled labour. Drilling and modifying beverage vessels is often not permitted by their owners and can compromise their structure and metallurgy. Chemical adhesives can take a long time to cure and have uncertain long-term performance when exposed to various cleaning chemicals used in the supply chain. In the case of RFID tags and Bluetooth beacons, the devices themselves have traditionally been affixed to the upper surface of the beverage container with little regard for obscuring any labelling such as safety warnings or interfering with vacuum lifting equipment that may depend on a uniformly smooth top domed surface of the beverage container in order to make a reliable seal. Indeed, welded RFID tags can present a serious safety risk to operators of vacuum based lifting equipment and, in some cases, the lifting equipment may be modified to accommodate their presence on beverage containers.

A single housing capable of housing multiple sensors and other electronic devices is preferable to multiple device housings for each beverage container for a variety of reasons. First, a housing capable of housing multiple sensors eliminates multiple installations on a beverage container. Second, multiple sensor housings may require multiple manners of attachment and detachment, therefore, when one becomes faulty, a technician might struggle locating and utilising tools for detachment and attachment. Third, multiple sensor housings as opposed to a housing with multiple sensors might be more expensive, not only in installation and replacement, but also for the sensors units themselves.

Various invasive methods of attaching devices to beverage containers can potentially compromise the beverage container significantly reducing its service life. If holes are drilled for fasteners, the structure of the beverage container can be weakened, and if welding is employed, the heat can damage the protective "stainless" oxide layer of the steel, promoting surface rust on both the outside and inside of the beverage container which can render the container unsuitable for service. If a device is faulty, detaching and attaching might require further invasive alterations to repeat the attachment. Other methods of attachment, as mentioned, may include glue which when hardened may not tolerate thermal expansion or deformation of the surface to which it is attached, potentially rendering the glue ineffective. It is an object of the presently disclosed non-invasive attachable smart housing for beverage containers to ameliorate these and other problems.

Disclosed is a smart device housing configured to fixably attach to a beverage vessel comprising a domed surface at a distal end, the domed surface adjacent a wall terminating at a lip, the smart device housing comprising an exterior configured as a transformable shape enabling a locking fit between the lip and the domed surface of the beverage vessel. Also disclosed is a system comprising a smart device that secures to a beverage vessel, the smart device comprising at least one proximity, image or distance sensor having a beam of detection with a path, the sensor located and directed such the beam of detection covers a location where a coupler can be attached to the beverage vessel, the smart device configured determine whether the coupler is attached to the beverage vessel by measuring whether the path is obstructed by the coupler. Also disclosed is a method of determining the fill status of a beverage container from at least one of the orientation, the temperature history, movement patterns, and presence or timing of attachment and/or detachment of a coupler to the beverage container.

Disclosed is a smart device housing and a method for using such a smart device housing being configured to securely attach to a beer keg comprising a domed surface at a distal end, the domed surface adjacent a vertical wall terminating at a lip, the smart device housing configured as a transformable shape of an initial vertical size and an initial vertical dimension so that it loosely fits between the lip and the domed surface, the transformable shape being configured to enable a size change from the initial vertical size to a greater locking fit size and the transformable shape being configured to enable a dimension change from the initial vertical dimension to a greater locking fit dimension, the size change and the dimension change to provide a locking fit between the lip and the domed surface of the beer keg to the smart device housing.

Also disclosed is a smart device housing wherein the increase in the dimension utilises at least one expanding member, the expanding member configured to be manipulated by way of at least one of compression, tension or torsional force, the expanding member being at least one of integral to the housing, attached to the housing or separate to the housing.

Further disclosed is a smart device housing wherein the increase in the size utilises at least one expanding member, the expanding member configured to be manipulated by way of at least one of compression, tension or torsional force the expanding member being at least one of integral to the housing, attached to the housing or separate to the housing.

Also disclosed is a smart device housing wherein the at least one expanding member is at least one wedge, deploying leg, screwing cone, eccentric cam, spring clip or extendable protrusion.

Further disclosed is a smart device housing of wherein a plurality of beer kegs comprises dimensional variance, wherein at least one of the expanding member is configured for a range of adjustment sufficient to overcome the dimensional variance. Differently-sized beer kegs have different dimensions, so the expanding member is configured to adjust to the dimensional variance.

Additionally, disclosed is a smart device housing wherein a plurality of beer kegs comprises size variance, wherein at least one of the expanding member is configured for a range of adjustment sufficient to overcome the size variance.

Also disclosed is a smart device housing wherein at least one of the expanding member is a lockable expanding member configured to be locked in a deployed state by at least one of a ratcheting mechanism, locking screw, friction, thread locker or tortuous path.

Furthermore, discloses is a smart device housing of whereby at least one of the lockable expanding member can be retracted or removed without damage by disengaging its locking mechanism with or without a specialised tool.

Additionally disclosed is a smart device housing whereby at least one surface is contoured to follow the lip of the beer keg.

Also discloses is a smart device housing comprising at least one wall that has a vertical height configured to be adjacent the vertical wall of the beer keg with compressional force for a locking fit between the lip and domed surface of the beer keg.

Also disclosed is a smart device housing configured with a window or lens for a line of sight between the inside of the housing and the location where a coupler may attach to the beer keg.

Furthermore disclose is a smart device housing of configured with a window or lens, configured with a view of the presence or absence of a beer keg to which the smart device may be attached.

Disclosed is a smart device that is configured to secure to a beverage vessel and a method of such a smart device, the beverage vessel comprising a coupler position where a coupler can be attached to the beverage vessel, the smart device comprising at least one proximity or distance sensor comprising a beam of detection configured to monitor a path between the proximity or distance sensor and a proximity of the position where a coupler can be attached to the beverage vessel, the proximity or distance sensor configured so that when the smart device is secured to the beverage vessel, the proximity or distance sensor is configured to be located and directed such that its beam of detection is configured to detect the path when the path is obstructed or unobstructed.

Also disclosed is a smart device wherein monitoring the path comprises providing data to determine whether there is no obstruction in the path, a coupler is at the coupler position, or another beverage vessel is stacked on top of the beverage vessel.

Additionally, disclosed is a smart device wherein the smart device further comprising a time data keeping capability, wherein when monitoring the path provides data that a coupler is at the coupler position, the smart device provides data of the length of time the coupler is at the coupler position.

Furthermore, disclosed is a smart device configured to provide data to determine whether the vessel is empty by determining that a coupler had been in the coupler position and that the coupler was removed from the couple position.

Also, disclosed is a smart device wherein the smart device further comprising a time data keeping capability, the smart device configured to provide data to ascertain the freshness of a beverage in the beverage vessel by determining the beverage vessel's fill time, its delivery time and the time when a coupler is at the coupler position.

Additionally, disclosed is a smart device wherein monitoring the path comprises providing data configured to provide a real-time stocktake.

Also, disclosed is a smart device wherein monitoring the path comprises providing data configured to automate re-stocking of beverages vessels.

Furthermore, disclosed is a method of a smart device that is configured to secure to a beverage vessel, wherein the beverage vessel comprises a position for a coupler which can be attached to the beverage vessel, wherein the smart device comprises at least one proximity or distance sensor comprising a beam of detection configured to monitor a path between the proximity or distance sensor and a proximity of the position where a coupler can be attached to the beverage vessel, the method of the smart device comprising securing the smart device to a beverage vessel so that the proximity or distance sensor is located and directed such that its beam of detection is configured to detect the path when the path is obstructed or unobstructed.

Also, disclosed is a method of a smart device wherein monitoring the path comprises providing data to determine whether there is no obstruction in the path, a coupler is at the coupler position, or another beverage vessel is stacked on top of the beverage vessel.

Additionally, disclosed is a method wherein the smart device comprises a time data keeping capability, wherein monitoring the path provides data that a coupler is at the coupler position such that the smart device provides data of the length of time the coupler is at the coupler position.

Furthermore, disclosed is a method of a smart device wherein monitoring the path provides data configured to determine whether the vessel is empty by determining that a coupler had been in the coupler position and that the coupler was removed from the couple position.

Also, disclosed is a method wherein the smart device further comprises a time data keeping capability, and monitoring the path provides data configured to ascertain the freshness of a beverage in the beverage vessel by determining the beverage vessel's fill time, its delivery time and the time when a coupler is at the coupler position.

Furthermore, is a method of a smart device wherein monitoring the path comprises providing data configured to provide a real-time stocktake.

Also, disclosed is a method of a smart device wherein monitoring the path comprises providing data configured to automate re-stocking of beverages vessels.

Also disclosed is a smart device housing and method thereof, configured with an internal inductive sensor, the inductive sensor configured to detect the presence or absence of a conductive beverage container to which the smart device may be attached.

Furthermore, is a smart device housing and method thereof, configured with a display screen, the display screen configured to show details or instructions pertaining to at least one of the smart device, a beverage vessel to which the smart device is attached, or a contents of a beverage vessel to which the smart device is attached.

The instant disclosure is provided to explain in an enabling fashion the best modes of making and using various embodiments in accordance with the present invention. The disclosure is further offered to enhance an understanding and appreciation for the invention principles and advantages thereof, rather than to limit in any manner the invention. While the preferred embodiments of the invention are illustrated and described here, it is clear that the invention is not so limited. Numerous modifications, changes, variations, substitutions, and equivalents will occur to those skilled in the art having the benefit of this disclosure without departing from the spirit and scope of the present invention as defined by the following claims.

It is understood that the use of relational terms, if any, such as first and second, up and down, and the like are used solely to distinguish one from another entity or action without necessarily requiring or implying any actual such relationship or order between such entities or actions.

Much of the inventive functionality and many of the inventive principles are best implemented with or in software programs or instructions and integrated circuits (ICs) such as application specific ICs and programmable microcontrollers. In the interest of brevity and minimization of any risk of obscuring the principles and concepts according to the present invention, discussion of such software and ICs, if any, is limited to the essentials with respect to the principles and concepts within the preferred embodiments.

DETAILED DESCRIPTION

Previously, the application of IoT technology in the beverage industry which utilises beverage containers or vessels as shown in the attached figures has been limited to passive, short range identification systems such as QR Codes, RFID transponders and Bluetooth Beacons, whereby persons or infrastructure must come in close proximity to optically or wirelessly scan the beverage container to determine its whereabouts in the supply chain. The disclosed smart device housing which is configured to accommodate various electronic systems reverses this modus operandi, allowing the smart-device-equipped beverage container to actively record and/or broadcast data autonomously without depending upon nearby persons or infrastructure in the supply chain, while also enabling myriad new functionalities beyond identification and location. While the disclosed smart device housing may perform functions that make the use of QR Codes and RFID transponders redundant, it may also support these features either alone, or alongside its enhanced functionalities, by way of a visually prominent space on which to attach a QR Code sticker or imprint, or by way of housing antenna and circuitry of an RFID transponder. A QR Code refers to any optically encoded machine-readable array of contrasting shapes, either encoded as a QR Code matrix, or in any other format including Barcodes and 2D Data Matrixes. The term QR is used for its ubiquity and descriptiveness even though other technical formats of data encoding may be used in its place.

Figure 1:
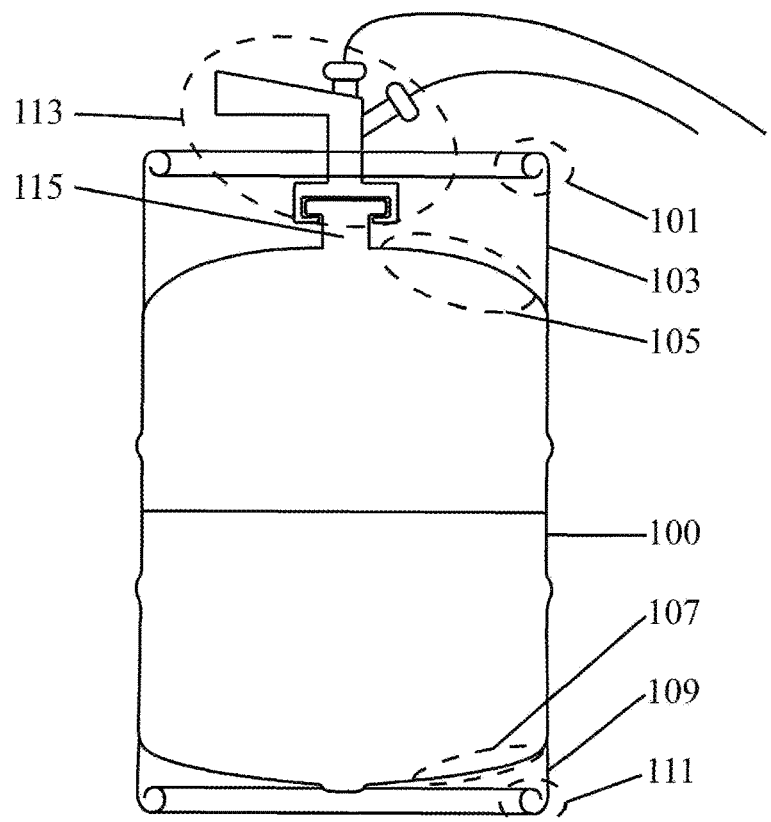
FIG. 1 depicts a cross section of a beverage container detailing a coupler attached to a valve, upper and lower lips, upper and lower chime walls and upper and lower domed surfaces.

FIG. 1 depicts a cross section of a beverage container detailing a coupler attached to a valve, upper and lower lips, upper and lower chime walls and upper and lower domed surfaces. Disclosed is a smart device housing configured to fixably and/or removably attach to a beverage vessel 100 comprising a domed surface 105, 107 at a distal end, the domed surface 105, 107 adjacent a wall 103, 109 terminating at a lip 101, 111, the disclosed smart device housing comprising an exterior configured as a transformable shape enabling a locking fit between the upper or lower lip 103, 111 and the upper or lower domed surface 105, 107 of the beverage vessel 100. Together the upper chime wall 103 and adjacent lip 101 may be referred together as the upper chime, just as the lower chime wall 109 and adjacent lip 111 may be referred to together as the lower chime. For simplicity of this discussion reference will be made to the upper identified, domed surface 105, the upper wall 103 and the lip 101 while the lower is equally relevant to this discussion.

It is understood that a smart device may include at least one of a sensor, transmitter, receiver, beacon, wireless or optical identifier, transponder or data recorder and/or other types of electronic devices and may be comprised of at least one of, the smart device housing, batteries, circuits, switches, sensors, antennas, microcontrollers, fasteners and electrical and electronic components.

The disclosed smart device housing comprises the outer shell of the smart device, along with its associated features which may include at least one of, a base, a lid, an expanding member, a fastener, a gasket, an identification sticker, an integrated antenna, a locking protrusion, a contoured spacer, a wedge, a metal bracket, an adhesive sticker, a window or a lens.

The disclosed smart device housing may serve one or more purposes including at least one of:

Providing a means of affixing the Smart Device securely to the Beverage Container.

Shielding its contents from physical impacts and damage.

Protecting its contents from disassembly by unauthorised persons.

Protecting its contents from the ingress of liquids, gasses and UV light.

Obscuring its internal contents to keep its value and functionality secret.

Making the smart device less conspicuous or obtrusive.

Providing a layer of thermal insulation to protect its contents from heat cycles.

Orienting and aiming internal sensors relative to the coupler of the beverage container.

Providing a means for internal circuitry to detect its attachment, removal or status of attachment with a beverage container Providing an electrical contact between internal electronic circuitry and the beverage container.

Providing a space for visual indications, advertisements or messages on the beverage container.

As mentioned above, FIG. 1 depicts a cross section of a beverage container detailing a coupler attached to a valve, upper and lower lips, upper and lower chime walls and upper and lower domed surfaces. Their annotations being:

Beverage container 100
Rolled rim of upper chime, lip 101
Upper chime wall, wall 103
Upper domed surface 105
Lower domed surface 107
Lower chime wall, wall 109
Rolled rim of lower chime, lip 111
Coupler 113
Valve 115

A beverage container typically features some form of valve 115 from which its contents can be filled and dispensed. In operation, a coupler 113 is mated to the valve 115, opening it for the flow of liquids and/or gasses. For ease of manufacture and operation, this valve 115 is typically located in the top centre of the upper domed surface 105 of the beverage container 100 but sometimes may reside in other areas. Together, the described features of the coupler 113, valve 115, chime walls 103, 109, rolled lips 101, 111 and domed surfaces 105, 107 of the beverage container 100 make up a configuration that is universally incorporated into many different types of beverage containers 100. It is understood that where the shape of a beverage container deviates from the disclosed shape and functionality of the average beverage container, the same disclosed features and methods of attachment of the disclosed housings and smart device components housed therein can be applied to various other beverage container configurations and other containers capable of receiving such disclosed smart device housings.

The above-described beverage container configuration in combination with industry practices of moving, filling, storing, rolling, stacking, washing and recycling of the beverage containers 100 makes difficult the possibility to configure one or more sensor housings for attachment to beverage containers 100 in a non-invasive manner. It is understood that this disclosure includes various means of fixably attaching the smart device housing to a beverage vessel comprising a domed surface 105 at a distal end, the domed surface 105 adjacent a wall 103 terminating at a lip 101, the disclosed smart device housing comprising an exterior configured as a transformable shape enabling a locking fit between the lip 101 and the domed surface 105 of the beverage vessel. Depending upon the type of sensing desired or required, more than one type of sensor may be housed in a smart device housing, thereby eliminating the need for multiple discrete housings. For example, location sensing might be combined with temperature sensing in the same smart device housing.

The disclosed smart device housing in one or more embodiments can be attached to a beverage container or vessel, without the need for specialised tools such as welding equipment or power tools, or requiring modifications to the beverage container. With regard to the specialised tools aforementioned, the fixable attachment of the smart device housing in some of its embodiments may utilise security type fasteners to impede unauthorised detachment or disassembly, such fasteners and their associated keyed drivers are off-the-shelf products and therefore here, may be considered not to be a specialised tool for the purpose of this disclosure. Additionally, specialised tools for attachment and/or removal are within this scope of this discussion. The smart device housing may be shaped and located to accommodate particular vacuum lifting equipment (the area of contact used by the vacuum lifting equipment shown in FIG. 12) and may be configured to support the requirements of modern Internet of Things (IoT) and Low Powered Wide Area Network (LPWAN) sensors (see FIG. 19 referring to a placement of electronic components within the housing) with respect to maximising the volume and area for a large battery, ground plane and sensors.

Throughout this disclosure there are numerous references to the beverage container to which the disclosed smart device housing is attached. While the disclosed smart device housing was initially developed and tested for attachment to stainless steel barrels containing beer, wine and spirits, its utility is relevant to any container or vessel comprising a domed surface 105 adjacent to a chime wall 103 terminating with a lip 101. The beverage container may not take the form indicated in FIG. 1 and may be made of non-stainless metals, or non-metallic materials and may be used for the storage of non-potable liquids or gasses. For the purpose of this disclosure the term beverage container is used for simplicity, even though the container to which the disclosed smart device housing is attached may not be used in conjunction with beverages. In other words, it is understood that the smart device housing may be used with any type of vessel, not necessarily shown here, but contemplated herein.

Due to the common use of pressurised carbonation in the composition of draught beverages as well as their dispensing systems, many storage and transport vessels used in the draught beverage supply chain are designed to incorporate a sealed, pressure-containing vessel in which the contents are stored. Therefore, many vessels feature predominantly rounded shapes so as to avoid sharp corners and weak points where the pressurised vessel could burst. Furthermore, due to the rough nature of handling throughout the supply chain, most beverage containers also feature some form of protection to the rounded pressurised vessel often referred to as a chime, comprising a lip 101, and a wall 103. The chime's purpose is many-fold, including to protect the pressurised vessel from impacts, providing a flat profile on which the rounded vessel may stand upright, offering a means to stack vessels on top of each other, and also providing "a rolling rim" on which the vessel can be tilted and rolled easily for transport and handling. The ends of the chime walls 101,103 may bear considerable impact force when the vessel is transported or dropped and hence are typically produced with a lip 101 that both increases the strength of the chime and hides the sharp edge that could damage its surroundings. In order to protect the distal ends of the pressure vessel, the lip 101 is distanced with a wall 103. Together, the lip 101, wall 103 and upper domed surface 105 are geometric features that are common to many beverage containers and with which the disclosed smart device housing in at least one disclosed embodiment beneficially cooperates.

In the process of discovering and establishing the many technical problems to be solved by the disclosed smart device housings and systems and methods of the smart device, including various sensor configurations which are possible based upon the disclosed smart device housing and system of the smart device, a prototype smart device housing was subjected to many months of in-field testing. Throughout the testing many intricacies of the supply chain were revealed including the handling, cleaning, filling and storage of the beverage containers and the way that even small alterations to their shape (such as the attachment of a small RFID tag to the upper domed surface 105) can wreak havoc on the transport and handling equipment. Other learnings were around the extra possible uses for the housed smart device in-field, and how its transformable shape for optimum location positioning could afford better sensing capabilities, for example, to detect when the keg was connected to a coupler 113, such included in system of a smart device disclosed herein. A determination of the strength, security and obscurity of the smart device housing were made.

FIGS. 2 through 10 depict the disclosed one or more embodiments to achieve the disclosed locking fit. A means of attachment to the beverage vessel is made possible by transformably altering the disclosed smart device housing's shape, in one embodiment increasing its height by the extension or addition of an expanding member so that the smart device housing becomes locked into position against the chime wall 103 of the beverage container. The locking fit of the disclosed smart device is illustrated in a number of manners in the figures that follow, however, the methods and manners used to form the transformable shape of the housing is not exhaustive in this disclosure. Any manner in which to position the housing in a locking fit with the domed surface 105 and the lip 101 of a beverage container is understood to be included in this disclosure. For example, the locking fit could also be accomplished by the addition of materials such as metal brackets, locking wedges or springs or a chemical filler that solidifies in situ such as expanding foam.

Figure 2:
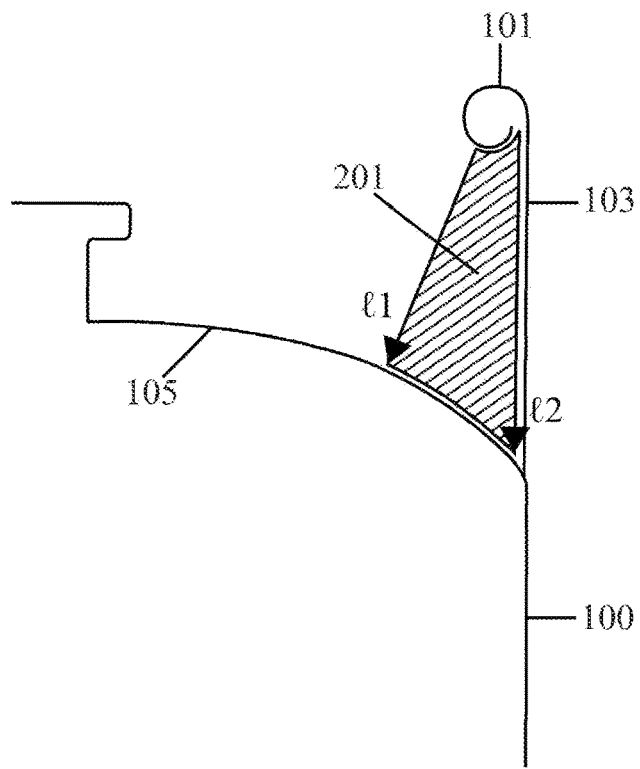
FIG. 2 depicts a cross section of the upper section of a beverage container, illustrating an area enclosed between a domed surface, a chime wall and a rolled rim, noting two dimensional lengths, l1 and l2.

FIG. 2 depicts a cross section of the upper section of a beverage container 100, illustrating an area 201 enclosed between a domed surface 105, a chime wall 103 and a lip 101, noting two dimensional lengths, l1 and l2. This figure illustrates that together, the three geometric features, namely the domed upper surface 105, chime wall 103 and lip 101 create an enclosed area 201 featuring a larger internal dimensional length l2 to that of its entrance l1.

Figure 3:
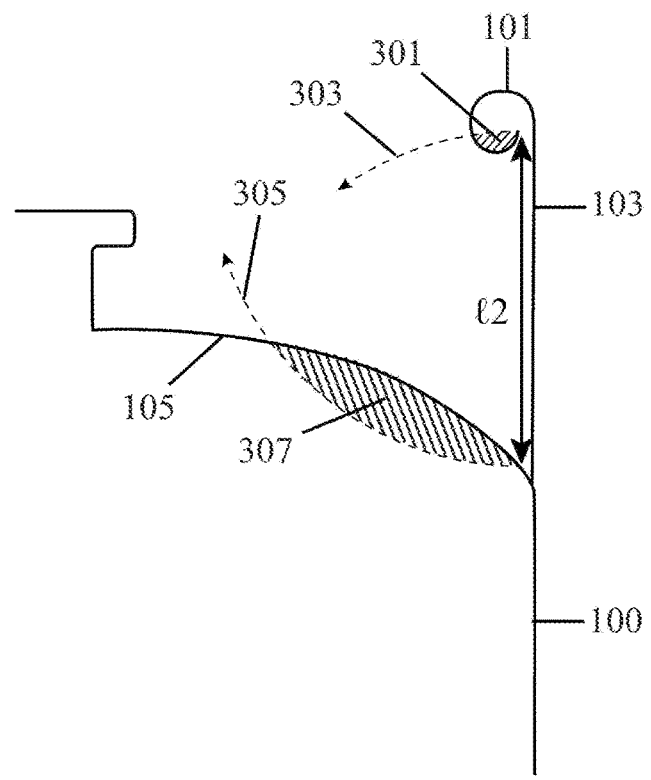
FIG. 3 depicts a cross section of the upper section of a beverage container, illustrating its domed surface, chime wall and lip along with a dimension l2 and the areas of interference through which it cannot pass.

FIG. 3 depicts a cross section of the upper section of a beverage container 100, illustrating a domed surface 105, a chime wall 103 and lip 101 along with a dimension l2 and the areas of interference 301, 307 through which it cannot pass. This illustration elaborates on the dimensions identified in FIG. 2, showing two possible paths of removal for an object with a dimension of l2 that is situated against the chime wall 103. One path involves pivoting the object at the base causing the top to follow path 303, the other path involves pivoting the object at the top, causing its base to follow path 307. The diagram illustrates by way of shaded areas 301, 307 that the paths 303 and 305 are obstructed by the rolled rim 101, and upper domed surface 105 geometric features of the beverage container 100 respectively.

Figure 4:
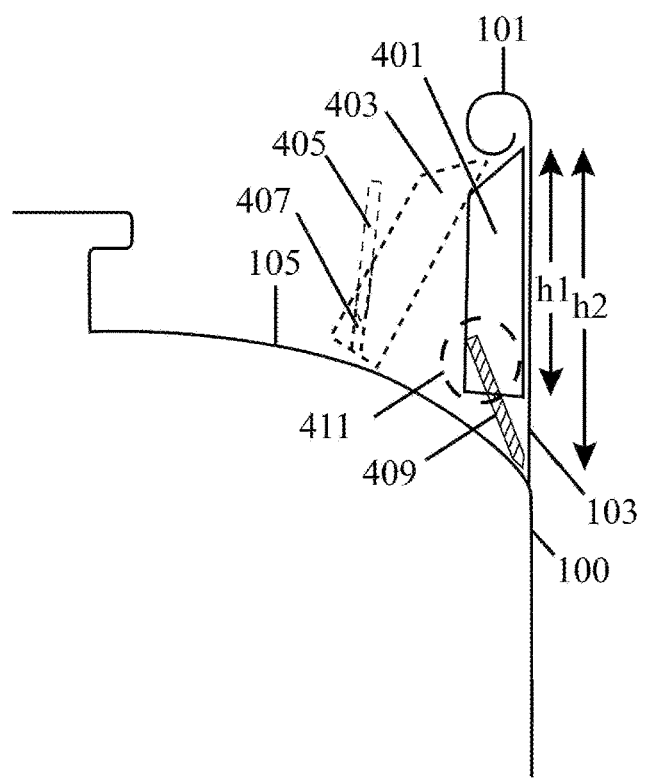
FIG. 4 depicts a cross section of the upper section of a beverage container and side view of one possible embodiment of a smart device housing with a transformable shape, illustrating its smaller form with a retracted expanding member and its expanded form with an extended expanding member, the heights of each form are illustrated, an area of overlap between the smart device housing and its expanding member is also detailed.

FIG. 4 depicts a cross section of the upper section of a beverage container 100 and side view of one possible embodiment of a smart device housing 403, 401 with a transformable shape, illustrating its smaller form 403 with a retracted expanding member 407 and its expanded form 401 with an extended expanding member 409. The heights h1, h2 of each form are illustrated. An area of overlap 411 between the smart device housing and its expanding member is also detailed. The diagram is simplified in shape and detail to focus solely on the method of attachment. In this embodiment, the expanding member 405, 409 may take the form of a threaded fastener that is secured through a path 407 in the housing 403 and is used to lock the housing into place 401 against the chime wall 103 by increasing the overall height of the smart device housing from h1 to h2 as it is deployed, thus transforming the shape of the smart device housing. Accordingly, described is a dimensional variance, wherein at least one of the expanding member 405, 409 is configured for a range of adjustment sufficient to fitably lock the housing between the domed upper surface 105, chime lip 101 and chime wall 103 of the beverage container 100.

The area of overlap 411 between the housing 401 and the expanding member 409 represents a range of adjustment sufficient to vary h2 in order to overcome the dimensional variance between different beverage vessels, be it through manufacturing design and tolerances or deformation during handling, such that one size of smart device housing can be affixed to beverage containers of numerous different makes and shapes. For example, different manufacturers produce beverage containers with different chime wall 103 heights and lip 101 diameters and the range of adjustment 411 is able to accommodate for these differences.

The expanding member 409 depicted in this embodiment can be a lockable expanding member configured to be locked in a deployed state by at least one of a ratcheting mechanism, locking screw, friction, adhesive or thread locker. The adjustment of the expanding member 409 may also be governed by use of a keyed or security type driver fitting to deter unauthorised removal of the smart device housing. In one embodiment, at least one of the lockable expanding member can be retracted or removed without damage by disengaging its locking mechanism with or without a specialised tool. An expanding member is incorporated into the transformable shape and is a movable feature that increases the overall dimensions of the object to which it is attached when it is moved, thus transforming the shape of the smart device housing.

Still referring to FIG. 4, in this way, the smart device housing, comprising the housing 401 and its one or more expanding member 409 comprises an exterior configured as a transformable shape enabling a locking fit between the lip 101 and the upper domed surface 105 of the beverage vessel 100. While this locking fit technically also incorporates the chime wall 103, this is omitted throughout this document because its presence is a natural consequence of the lip's 101 existence and its function is a natural consequence of the locking fit between the lip 101 and the domed upper surface 105. It is understood that the disclosed housing may be positioned or rest against the chime wall 103 or not.

Still referring to FIG. 4, the additional member 409 is shown being installed to transform the shape of the housing. That is, in FIG. 4, the increase in the dimension utilises at least one expanding member 409, the expanding member configured to be manipulated by way of at least one of compression, tension or torsional force, or any other type of force, the expanding member being at least one of integral to the enclosure, attached to the enclosure or separate to the enclosure.

As is understood, the transformable shape of the disclosed smart device housing is configured in a number of manners, according to this disclosure and any variations thereof. As shown in FIG. 4, the additional member 409 can be one, two or more screws that when seated, press against the beverage container 100 and or upper domed surface 105 to lodge or fixably lock the housing 401 substantially within the space 201 shown in FIG. 2, and therefore preferably avoiding the interference zones 301, 307 shown in FIG. 3. It is understood that attachment used in the context of this disclosure is non-invasive attachment.

Figure 5:
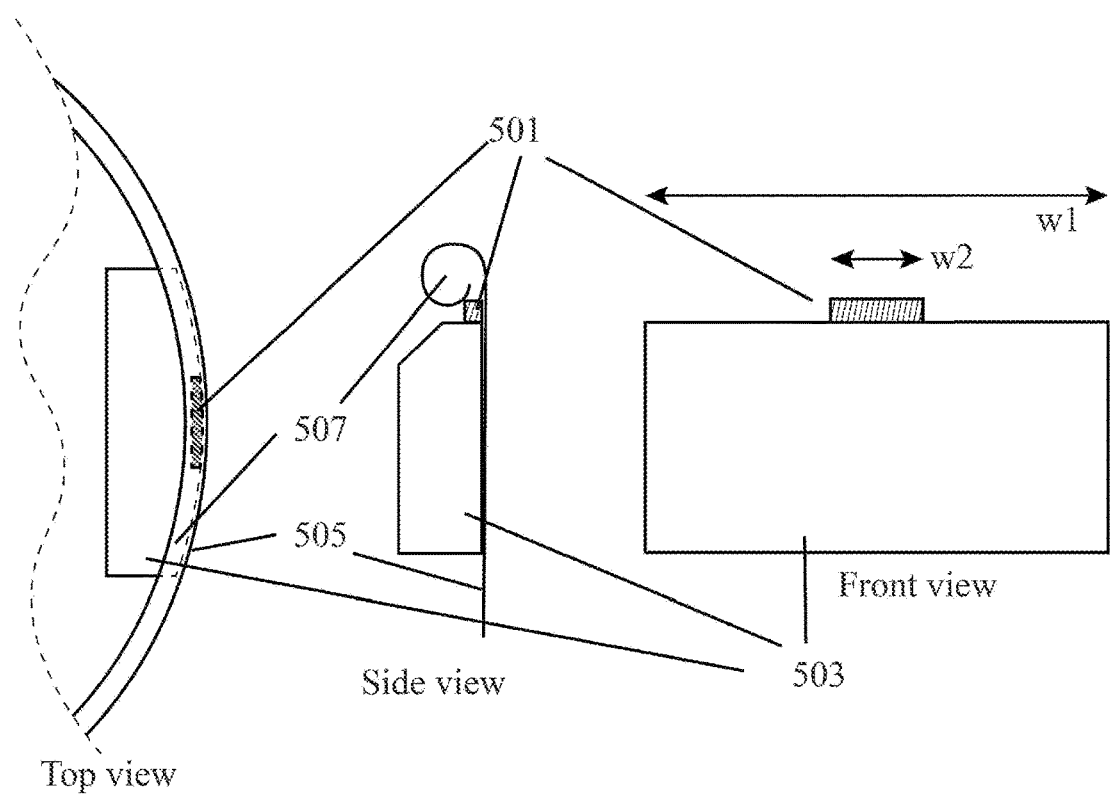
FIG. 5 depicts a top, front and side view of a smart device housing, mounted against a chime wall, detailing a tongue interlocking with the lip of a beverage container, a relative width of the tongue and smart device housing are noted.

FIG. 5 depicts a top, front and side view of a smart device housing 503, mounted against a chime wall 505, detailing a tongue 501 interlocking with the lip 507 of a beverage container. A relative width of the tongue w1 and smart device housing w2 are noted. The previously described expanding member and other features are omitted from this diagram for clarity. The tongue 501 is configured in a manner that it may occupy a space between the lip 507 and chime wall 505 of the beverage container providing a means for the upper portion of the housing to gain purchase behind the lip 507 to form part of a locking fit of the smart device housing to the beverage container. While the tongue 501 is depicted as having a square outline, embodiments where its shape differs are anticipated. The tongue 501 features a reduced width w2 with respect to the overall width w1 of the smart device housing and may improve the ability of the smart device housing to lockably fit onto beverage containers of varied diameters. The tongue width w2 is chosen as a compromise between strength and flexibility. For example, in one embodiment, the tongue width w2 is chosen such that the smart device housing can attach to both Euro and DIN sized beer kegs, but may be kept wide enough so as to retain substantial strength beneficially reducing possible risk of breakage.

Figure 6:
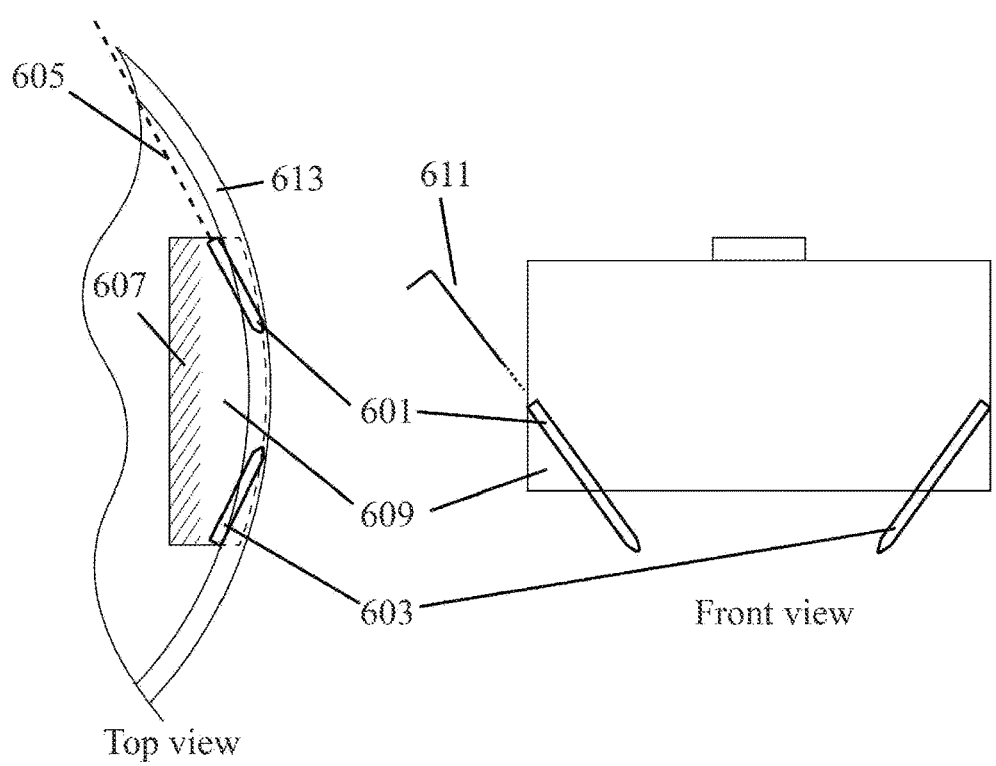
FIG. 6 depicts a top and side view of a disclosed smart device housing with two expanding members and a tool. The angles of the expanding members are illustrated in both planes along with a dotted path on which the tool may align, a hatched area on the front surface of the smart device housing is shown as well as a lip of a beverage container in the top view.

FIG. 6 depicts a top view and side view of a smart device housing 609 with two expanding members 601, 603 and a tool 611. The angles of the expanding members are illustrated in both planes, as well as a dotted path 605 on which the tool 611 may align. A hatched area 607 on the front surface of the smart device housing 609 is shown as well as a lip 613 of a beverage container in the top view.

The orientation of the expanding members 601, 603 is shown with relation to an embodiment of the smart device housing 609, illustrating their diagonal angles on both a horizontal (Top View) and vertical (Front View) plane. It is understood that the orientation and location of the expanding members 601,603 may be controlled by a guide within the housing that is not depicted herein for clarity because it follows the same path as the expanding members. While the angle and location of the expanding members 601,603 may function to attach the smart device housing to the beverage container as described above, their orientation may also be configured to allow accessibility by fastening tools when being mounted/attached/fixably locked to a beverage container, or removed. A tool 611 might be used to assist manipulating the expanding member 601,603. In this figure, an Allen wrench is depicted, however it is understood that the tool might be another type of off-the-shelf tool, or custom made for the job. In order to allow access by the tool 611, the internal guide for the expanding members 601, 603 may be oriented on a diagonal plane, both horizontally and vertically, such that a clear path 605 exists for access by the tool to mate with the expanding member without the chime lip 613 impeding its direct access. Furthermore, the guide for the expanding members 601,603 may be oriented as low and rearward as possible within the housing 609, while maintaining the direct access for drivers aforementioned in order to occupy a minimal internal volume of the enclosure for their path and thereby possibly leaving behind the largest possible volume for the other internal components of the smart device such as large batteries and circuits, especially in the frontal area 607 of the housing where large antennas and ground planes may reside.

While the transformable shape of the housing 401 depicted in FIG. 4 may include the addition of at least one expanding member as shown in FIGS. 4 and 6, the transformable shape of the housing can alternatively include features integral to the housing that alter the shape of the housing, such as springs released for tension, and/or levers to push the sides or top and/or bottom panels outward to secure the housing. That is, in one or more embodiments, at least one dimension of the transformable shape has an initial dimension, the dimension configured for an increase in the dimension to greater than the initial dimension, for a locking fit between the rolled rim and the domed surface of the beverage vessel. Accordingly, it is understood that in one embodiment at least one wall may have a vertical height configured to be adjacent the rolled rim with compressional force for a locking fit between the rolled rim and domed surface of the beverage vessel.

Embodiments of the attachable smart device housing may incorporate the at least one expanding member of the transformable shape taking the form of one of wedge, deploying leg, screwing cone, eccentric cam or extendable protrusion.

Figure 7:
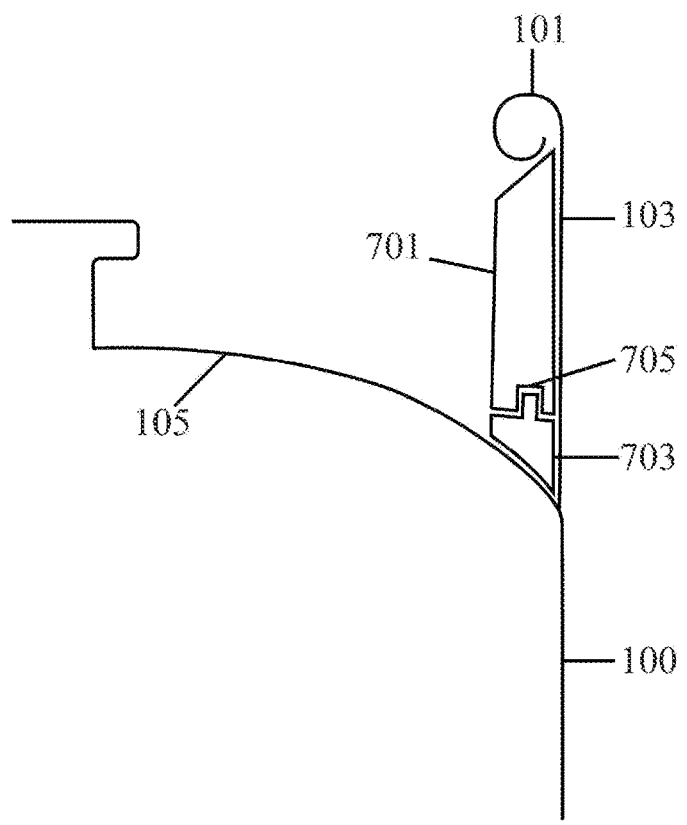
FIG. 7 depicts the side view of one possible embodiment of the disclosed smart device housing featuring a wedge with interlocking tongue and groove mounted to a beverage container.

FIG. 7 depicts the side view of one possible embodiment of the disclosed smart device housing 701 featuring wedge 703 with interlocking tongue and groove 705 mounted to a beverage container 100. In this illustration the expanding member may take the form of a wedge 703, situated beneath the housing 701, whereby the wedge 703 and housing 701 interlock 705 to ensure that the addition of the wedge 703 secures the housing 701 within the upper domed surface 105, chime wall 103 and lip 101 of the beverage container 100. It is understood that the use of a contoured wedge 703 to create a locking fit of the disclosed smart device housing may distribute the vertical locking force over a larger area of the upper domed surface of the beverage container which may reduce risks of damage to the beverage container if the lip 101 or chime wall 103 becomes deformed in use.

Figure 8:
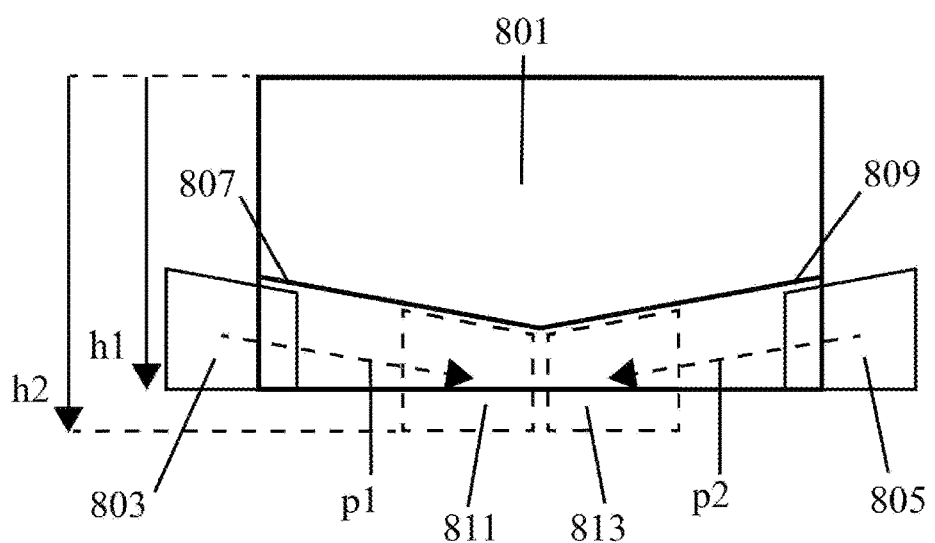
FIG. 8 depicts a rear view of the smart device housing depicted in FIG. 7, illustrating the one or more expanding members in the form of sliding wedges that follow a guide configured to increase the overall height of the smart device housing.

FIG. 8 depicts a rear view of the smart device housing 801 depicted in FIG. 7 701, illustrating the one or more expanding member in the form of sliding wedges 803,805 that follow a guide 807,809 configured to increase the overall height h1, h2 of the transformable shape of the disclosed smart device housing 801.

The illustration shows the way in which the wedges 803 805 may be contoured and the way the guides 807, 809 in the housing 801 may be angled such that by pushing the wedges in from the side they are guided by guides 807,809 to follow paths p1, p2, converging to new locations 811,813. This motion may cause the overall dimension h1 of the disclosed transformable smart device housing to increase from h1 to h2 to aid in forming a locking fit with a beverage container as described earlier.

Figure 9:
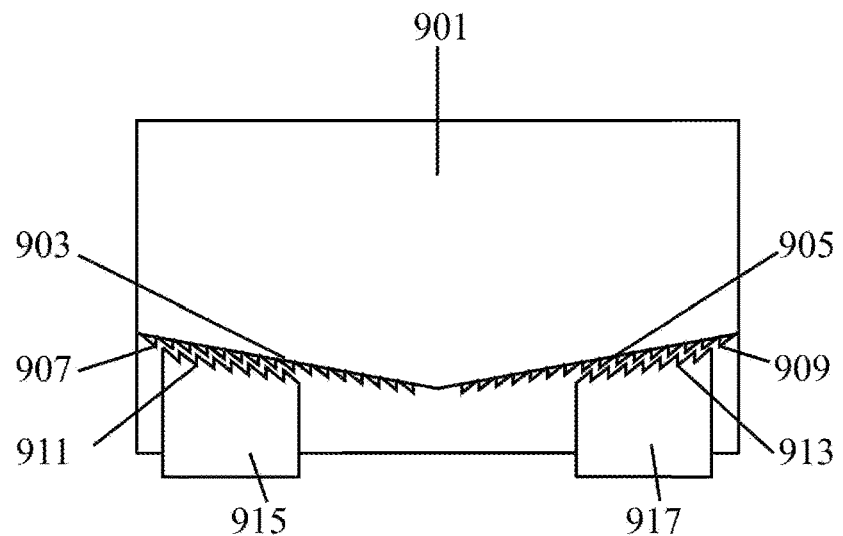
FIG. 9 depicts a rear view of the smart device housing and sliding wedges depicted in FIG. 8, illustrating a ratcheting mechanism on the wedges and housing.

FIG. 9 depicts a rear view of the disclosed smart device housing 901 and sliding wedges 915,917 depicted in FIG. 8, illustrating a ratcheting mechanism on the wedges 911,913 and housing 907,909.

The figure illustrates a means by which the at least one expanding member, being wedges 915, 917 in this embodiment can be locked in place for a fixable attachment of the smart device housing 901. In this illustration, the housing 901 features guide paths 903 and 905 that are serrated with jagged teeth 907, 909 configured to mate with matching teeth 911, 913 on the wedges 915, 917 to form a one-way ratcheting mechanism to fixably hold the wedges 915,917 in place following installation, maintaining the transformation of the smart device housing 901 from the height h1 to the height h2 depicted in FIG. 8. It is anticipated that this ratcheting mechanism may also include a means to defeat the ratcheting for non-destructive removal of the wedges using a tool that may or may not be specialised.

Figure 10:
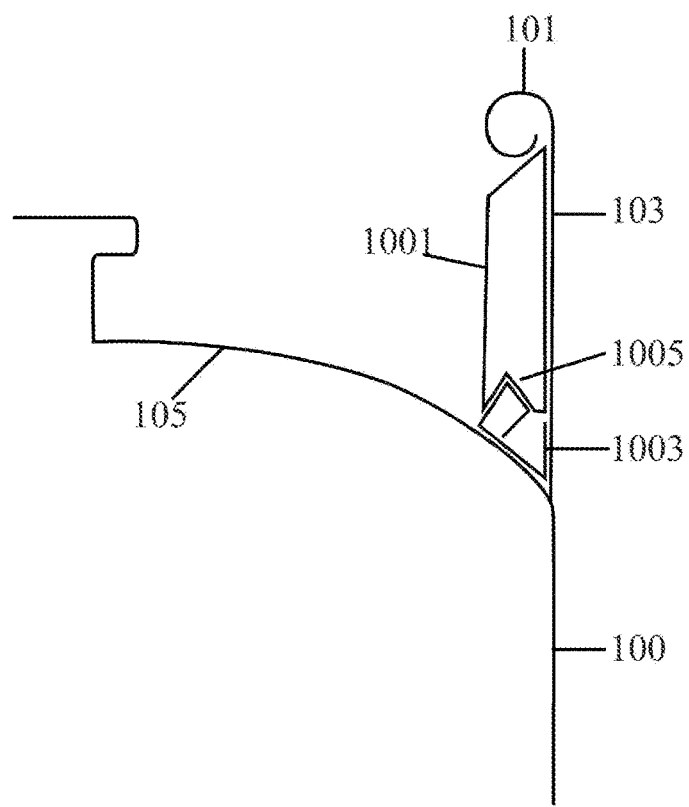
FIG. 10 depicts the side view of an embodiment of the disclosed smart device housing featuring a "V" shaped groove and a folded metal bracket forming a locking fit with a beverage vessel.

FIG. 10 depicts the side view of an embodiment of the smart device housing 1001 featuring a v shaped groove 1005 and a folded metal bracket 1003 forming a locking fit between the domed upper surface 105 and lip 101 of a beverage vessel 100. The bracket may be made of spring steel to aid in insertion and extraction.

It is understood that the housing's transformable shape includes utilising any other feature(s) that may make the shape adaptable or compliant to become any shape or construction enabling a locking fit between the lip and the domed surface of the beverage vessel.

It is further understood that in one embodiment of the transformable shape at least one of its dimensions is increased by addition of a viscous or malleable material, the material solidifying in situ by chemical process, thereby becoming an integral part of the attachable object forming a locking fit between the rolled rim and domed surface. It is also understood that the enclosure may include one or more protrusions or recesses allowing the malleable material to gain a mechanical purchase on the attachable object before solidifying.

Figure 11:
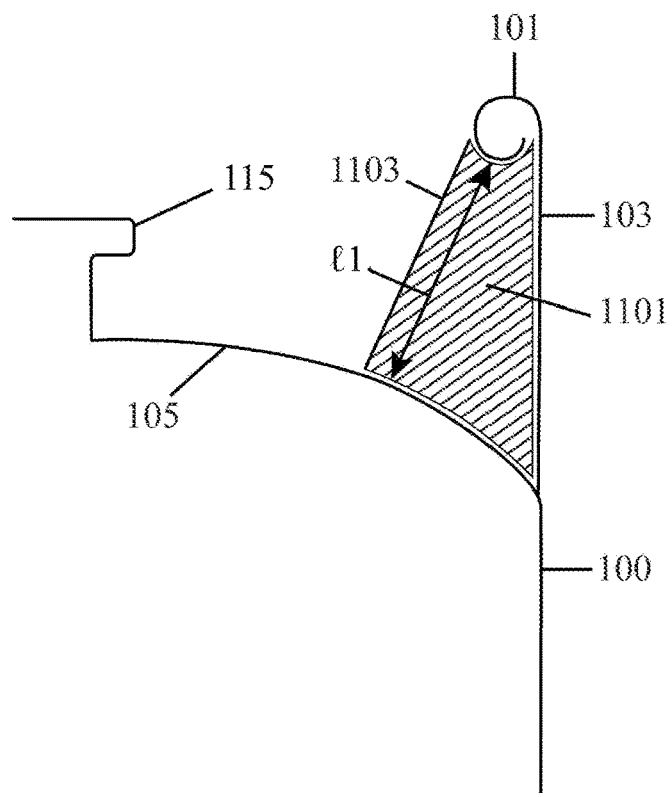
FIG. 11 Depicts the cross-sectional side view of a beverage container, detailing its valve, upper domed surface, chime wall and lip along with an area of protection formed within these features. Also illustrated is a tangent between the upper domed surface of the beverage vessel and its nearest point on the lip.

FIG. 11 Depicts the cross-sectional side view of a beverage container 100, detailing its valve 115, upper domed surface 105, chime wall 103 and lip 101 along with an area of protection 1101 formed within these features.

The area of protection is bordered with a dimension 1103 that is parallel with the entrance to the cavity 11 introduced in FIG. 2 but aligned with the point of the lip 101 that is closest to the valve 115. As discussed above, in testing, the area of protection 1101 has been discovered to beneficially provide shelter from hazards in the supply chain and may be used as a location for attaching the disclosed smart device housing. A smart device housing in this location may be unlikely to impede safety labels on the upper domed surface 105 of the beverage container, and may have a reduced likelihood of interference with vacuum based lifting equipment in the supply chain. The shape, location and dimensions of the area of protection 1101 illustrated here may be beneficially incorporated in various embodiments of the disclosed smart device housing and methods and systems of smart devices for beverage containers.

Figure 12:
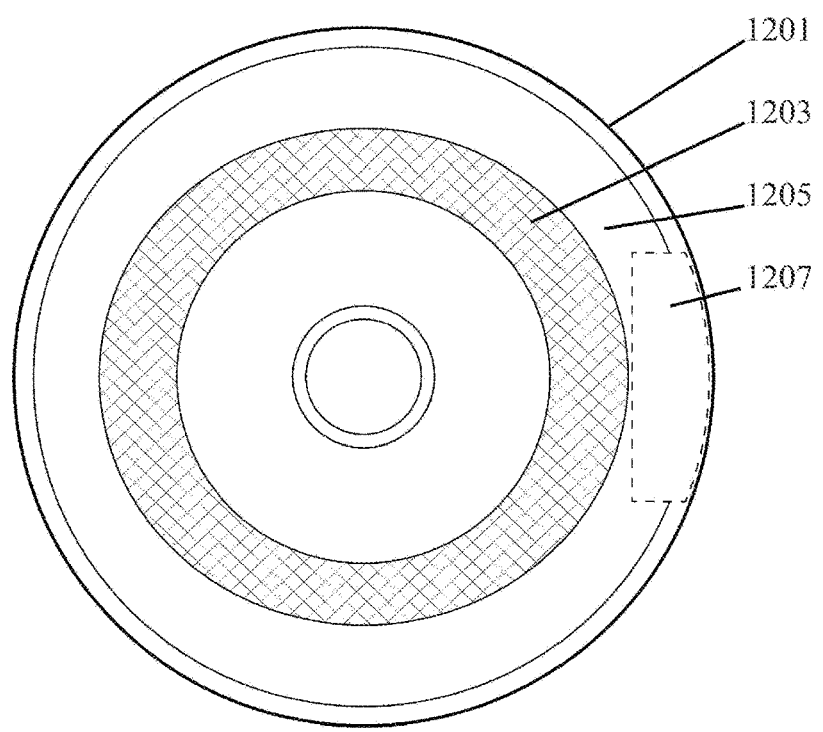
FIG. 12 depicts a top-down view of a beverage container and illustrates an area of contact, to which in a commercial setting, a vacuum device might make a seal in order to move it. An outline is illustrated which shows an area where a disclosed smart device housing may reside without interfering with the vacuum device's area of contact.

FIG. 12 depicts a top-down view of a beverage container and illustrates an area of contact 1203, to which in a commercial setting, a vacuum device might make a seal in order to move it. An outline 1207 is illustrated which shows an area where a smart device housing may reside without interfering with the vacuum device's area of contact.

In the supply chain, vacuum lifting equipment typically contacts the circular area 1203 of the upper domed surface of a beverage container 1205 in order to establish an airtight seal which is used for lifting, transporting and handling the beverage container. In order to make a safe airtight seal, the circular area 1203 may be required to have a uniformly smooth surface, making it an unsuitable zone for the attachment of smart devices. The practise of vacuum lifting is commonly used for moving beverage containers between pallets, conveyors throughout the supply chain and therefore is catered for in the size, shape and location of at least one embodiment of the disclosed smart device housing. One possible location and shape 1207 for an embodiment of the disclosed smart device housing is illustrated, showing that it may lockably fit against the chime wall 1201 so maximize possible size, without interfering with a vacuum lifting device.

In the various methods and systems disclosed herein is disclosed a coupler detection system and method. As mentioned, most beverage containers feature some form of valve 115 from which its contents can be filled and dispensed. In order to fill or empty the beverage container 100, a coupler 113 is mated to the valve 115 enabling the insertion or extraction of liquids and/or gasses. As a universal industry standard, the valve 115 is typically located in the top centre of the upper domed surface 105 of the beverage container 100. The disclosed smart device housing in some embodiments may cooperate with the shape, size and location of the coupler 113 attachment to detect its presence and monitor insights about the usage, orientation or external environment of the beverage container 100 as is discussed with respect to FIGS. 13-16 below. The optical detection system and method described hereafter holds the benefit of not being invasive to the beverage vessel while also not necessitating any openings or eternal sensors to the enclosure, thereby minimizing any risks of leaks forming in the enclosure which can simplify its mechanical characteristics. Data from the optical system can be used, for example, in conjunction with machine learning to infer the amount of liquid or gas in a beverage container, negating the need for traditional sensing technologies such as ultrasonics or load cells or level sensors inside the beverage container. The disclosed smart device housing in combination with the shape, size and location of the coupler attachment may provide the opportunity to detect the coupler's presence and monitor the consumption of the contents of the beverage container.

The use of the optical sensor and/or other sensors used independently, and/or combination can provide data to determine the consumption time and rate of consumption of the beverage, whether the vessel is empty and ready for collection, and/or to ascertain the freshness and time to consumer of beverages at time of consumption. Such information can be used to conduct real-time inventory checks at venues, or automate the replenishment of stocks or retrieval of empty beverage containers and may increase the number of cycles a beverage container may complete, therefore increasing its value.

Figure 13:
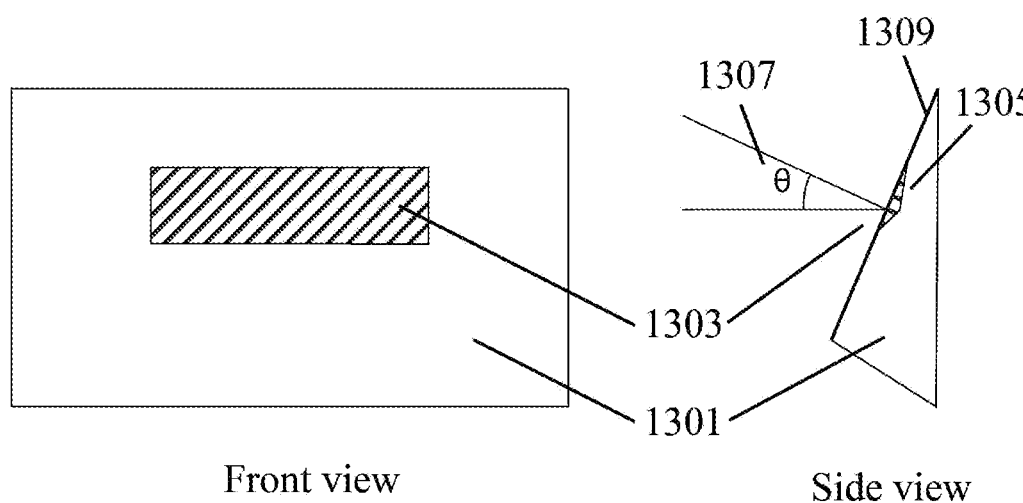
FIG. 13 depicts the front and side view of an embodiment of a disclosed smart device housing detailing a window, the side view depicting a window that is shaped as a lens for aiming a beam of detection. An angle is illustrated showing a deviation of the beam of detection from being perpendicular to the front surface of the smart device housing.

FIG. 13 depicts the front and side view of an embodiment of a smart device housing 1301 detailing a window 1303. The side view depicts a window that is shaped as a lens for aiming a beam of detection. An angle 1307 is illustrated showing a deviation of the beam of detection from being perpendicular to the front surface 1309 of the smart device housing.

The window 1303 is transparent to at least one wavelength of light, allowing an internal optical sensor to detect at least one of: the presence of a coupler 113 on the beverage container 100; the presence of a second beverage container stacked on top of the beverage container; a flat surface against the beverage container 100 for example if it were placed upside down on flat ground; and/or images of the surroundings of the beverage container. In this illustration the window 1303 is located on the front surface of the smart device housing 1309, but other locations are contemplated. A particular optical sensor may be chosen after tests as a practical means of detecting the usage of the beverage vessel and inferring its state of fill, fill status or partial or complete fill or empty state or status. The optical sensor employed may be, for example, one or more of a distance sensing sensor, a reflectance measuring sensor, a time of flight sensor, a linear CCD array sensor, an ambient light sensor or a digital camera sensor along with any active optical illumination source to aid in the operation of the sensor. In one embodiment, a light may also be shone outwardly from the window, and the window may also be used for collection of light for measuring the brightness or UV exposure of its environment, or energy harvesting purposes. The housing 1301 may also incorporate a prism 1305 or other optics into the shape of the window 1303 in order to direct or focus the angle of vision 1307. Alternatively, the entire angle of the front of the housing 1309 along with the sensor within may be selected to aim the sensor in an optimal sensing direction without the use of optics.

While describing a method of and system for determining the fill status of a beverage container, various other manners to determine the fill status and other characteristics relevant to supply chain management can be determined from at least one of the orientation, the temperature history, movement patterns, and presence or timing of attachment and/or detachment of a coupler to the beverage container. As described in detail below, sensors in addition to or in combination with a sensor to generate and/or determine coupler data may provide additional data which can be valuable as supply chain information such as the consumption time and rate of consumption of the beverage, whether the vessel is empty and ready for collection, and/or to ascertain the freshness and time to consumer of beverages at time of consumption. Disclosed is a method comprising a smart device comprising at least one proximity, image or distance sensor having a beam of detection with a path may include the sensor locating and directing such the beam of detection so that the beam covers a location where a coupler can be attached to the beverage vessel, the smart device configured determine whether the coupler is attached to the beverage vessel by measuring whether the path is obstructed by the coupler.

Figure 14:
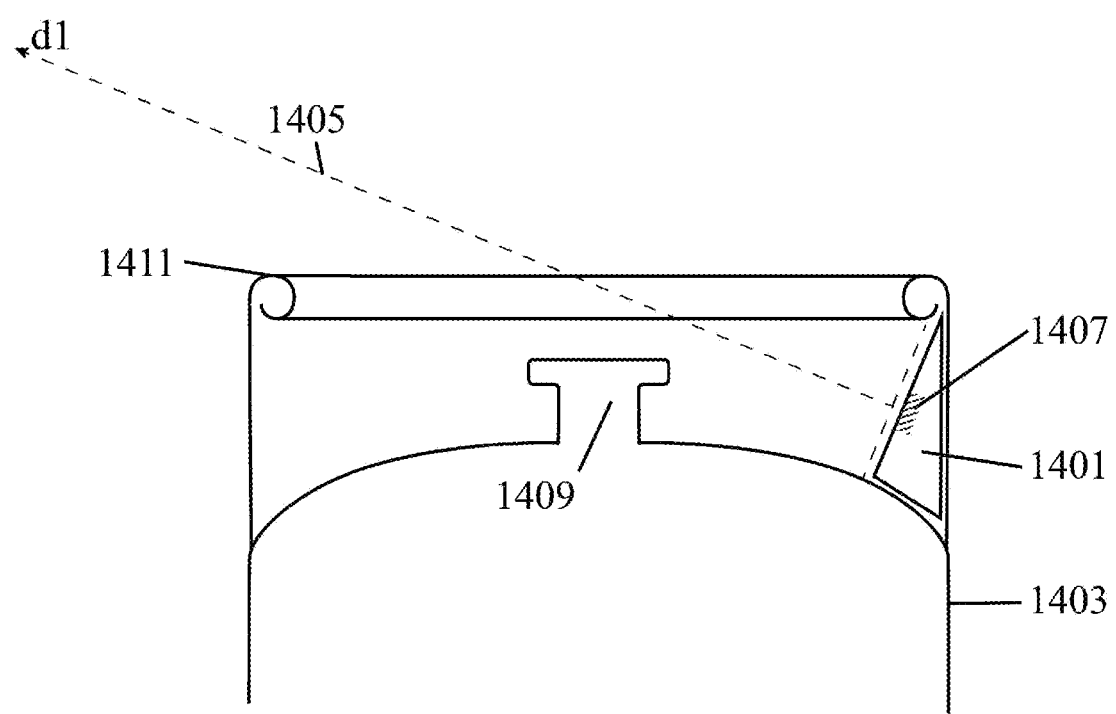
FIG. 14 depicts a cross-sectional side view of one possible embodiment of the disclosed attachable smart device housing, mounted and/or fixably locked to a beverage vessel without a coupler attached to its valve, the detection beam of an optical sensor, oriented to face towards the location where a coupler may be attached to the valve of the beverage container, marked with a distance that is observed by the optical sensor with no obstruction in the near field of its path.

FIG. 14 depicts a cross-sectional side view of one possible embodiment of the attachable smart device housing 1401, mounted and/or fixably locked to a beverage vessel 1403 without a coupler attached to its valve 1409, the detection beam 1405 of an optical sensor 1407, oriented to face towards the location where a coupler may be attached to the valve 1409 of the beverage container 1403, marked with a distance d1 that is observed by the optical sensor with no obstruction in the near field of its path.

In this illustration, the optical sensor 1407 may be a proximity or distance sensor, or any other suitable sensor, may be oriented to face above the valve 1409 and far lip 1411 of the beverage vessel, passing through the location where a coupler would typically be attached. The optical sensor 1407 in this configuration gathering a measurement corresponding to the distance d1 being a relatively large, undefined length that is beyond the far edge of the keg and greater that the later defined distances d2, d3 and d4 and therefore being able to determine that there is no coupler attached to the beverage container, that there is no other beverage vessel stacked on top of the beverage container, and the beverage container is not covered by a flat surface. This determination may also be made by use of an image sensor detecting the shape, pattern or size of the coupler rather than the distance to it. That is, the sensor can be used to determine whether the beverage vessel is coupled to a coupler by measuring the changed signal when the path 1405 is obstructed by the coupler. That is, the housing can include a smart device that secures to the beverage vessel 1403, featuring at least one proximity, distance or image sensor 1407 having a beam or vision of detection with a path 1405, the sensor located and directed such the beam or vision of detection covers a location where a coupler can be attached to the beverage vessel, the smart device configured to determine whether the coupler is attached to the beverage vessel by measuring whether the path is obstructed by the coupler.

Figure 15:
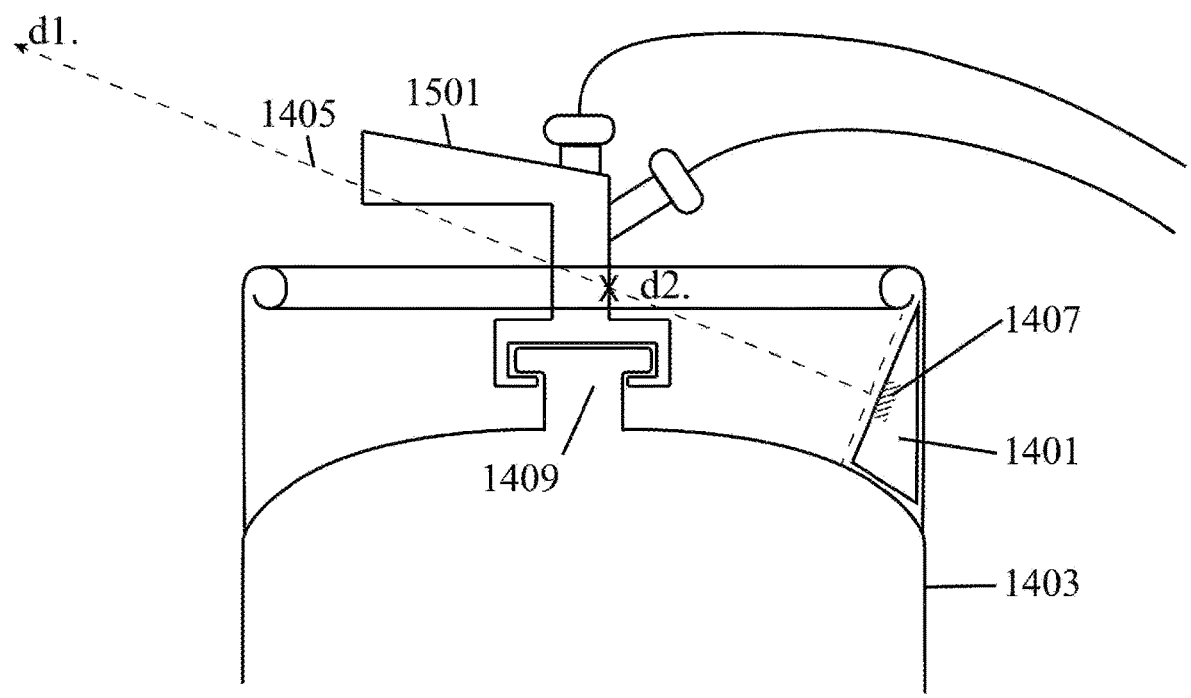
FIG. 15 depicts a cross-sectional side view of the disclosed attachable smart device housing from FIG. 14, mounted to a beverage vessel with a coupler attached to its valve. A detection beam aimed at the coupler is illustrated, a distance to the coupler and a longer distance beyond the coupler is noted.

FIG. 15 depicts a cross-sectional side view of the attachable smart device housing from FIG. 14 1401, mounted to a beverage vessel 1403 with a coupler 1501 attached to its valve 1409. A detection beam 1405 aimed at the coupler 1501 is illustrated. A distance to the coupler d2 and a longer distance beyond the coupler d1 is noted. A detection sensor may utilise any type of input including sound or radiation for determining obstructions at varying distances from the sensor. Furthermore, one or more types of sensors may be utilised independently or in combination to obtain various data sets.

This Figure (FIG. 15) shares the components of FIG. 14 but with the addition of a coupler 1501 to the beverage container 1403's valve 1409. The detection beam 1405 is impeded by the coupler 1501, reducing the measured distance from d1 to d2. The smart device may be configured to correlate the signal measured by the sensor 1401, viewing a coupler 1501 at a distance of d2 with the status of having a coupler attached. This data may also signal that the beverage vessel does not have another vessel stacked on top, nor is it upside down on a flat surface. Furthermore, by recording the times when the coupler 1501 is determined to be attached or removed, or by reporting the presence of the coupler 1501 at regular intervals, insights into the status of the beverage container, such as being full, being on tap, or being empty and possibly ready for collection, as well as its rate of consumption, or an estimation of its fill level may be determined.

Figure 16:
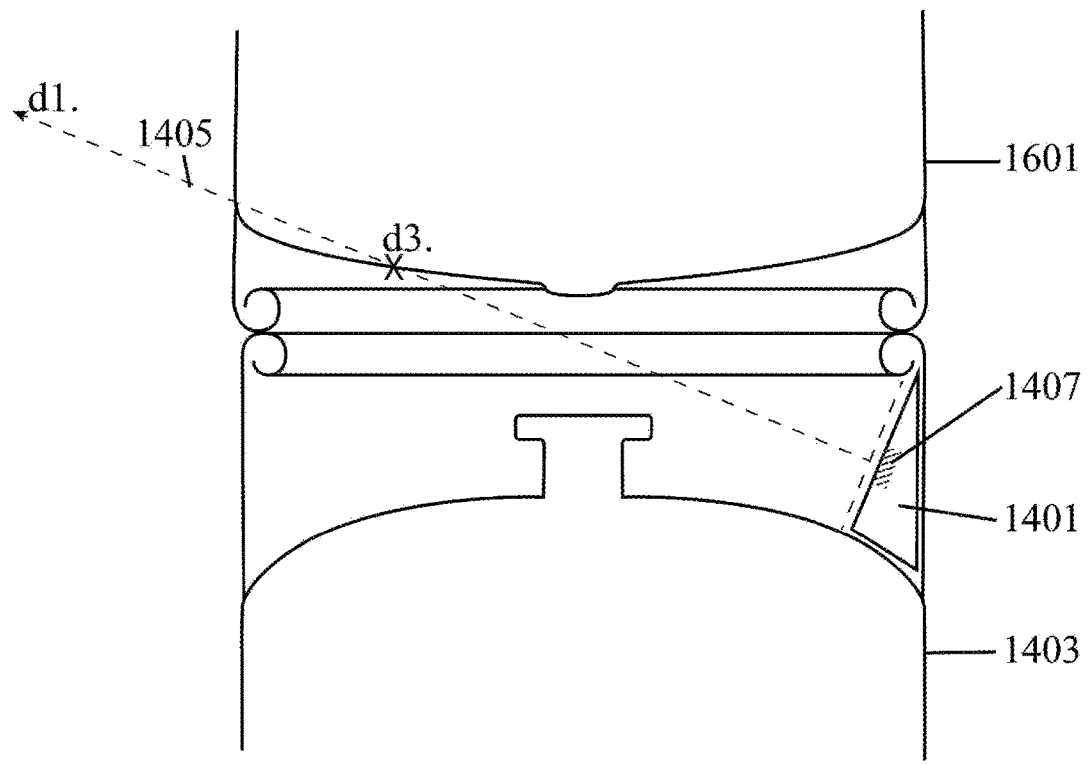
FIG. 16 depicts a cross-sectional side view the disclosed attachable smart device housing from FIGS. 14 and 15, mounted to a beverage container with another beverage container stacked on top of it, a detection beam is illustrated, aiming toward the bottom of the top beverage vessel, a distance to the bottom of the top beverage container and a longer distance beyond the top beverage container is noted.

FIG. 16 depicts a cross-sectional side view the attachable smart device housing 1401 from FIGS. 14 and 15, mounted to a beverage container 1404 with another beverage container 1601 stacked on top of it. A detection beam 1405 is illustrated, aiming toward the bottom of the top beverage vessel. A distance to the bottom of the top beverage container d3 and a longer distance beyond the top beverage container d1 is noted.

In this illustration the detection beam 1405 is obstructed by the base of the stacked beverage container 1601 which may result in a measured distance from the optical sensor 1407 of d3, which is larger than d2, but lesser than d1. Alternately the optical sensor may detect an image that may be interpreted to represent the bottom of the stacked keg 1601. In either case, this measurement or observation may be correlated with the status of the beverage container 1403 having another beverage container 1601 stacked on top and furthermore surmising that a coupler is not attached to the beverage container 1403 and that the beverage container is not lying face down on a flat surface. It is understood that while reference is made to the bottom of the stacked beverage container 1601, it may be stacked upside down, and the same principals apply to detecting the top of the stacked beverage vessel 1601 since it is upside down.

Figure 17:
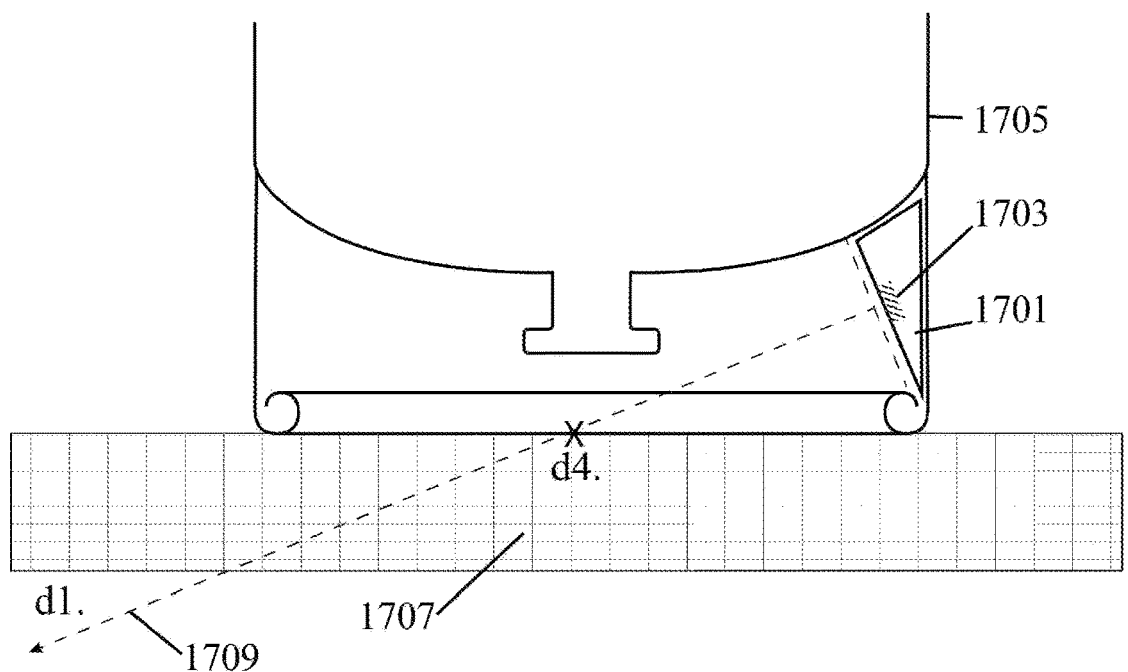
FIG. 17 depicts a cross-sectional side view of the disclosed attachable smart device housing from FIGS. 14, 15 and 16, mounted to a beverage container that is positioned upside down on a flat surface. A detection beam is illustrated, aiming toward the flat surface, a distance to the flat surface and a longer distance beyond the flat surface are noted.

FIG. 17 depicts a cross-sectional side view of the attachable smart device housing 1701 from FIGS. 14, 15 and 16, mounted to a beverage container 1705 that is positioned upside down on a flat surface 1707. A detection beam 1709 is illustrated emanating from an optical sensor 1703, aiming toward the flat surface 1707. A distance d4 to the flat surface 1707 and a longer distance d1 beyond the flat surface are noted.

In this figure, the presence of the flat surface 1707 against the beverage container 1705 intersects the beam 1709 at the distance d4, which may be shorter than the previously noted measurements d1 and d3 and may be longer than d2. This distance, or an optical image of the flat surface may be interpreted by the optical sensor 1703 to determine information about the status of the beverage container 1705 and its contents, such as the absence of a coupler, or the orientation of the container. It is noted that in some beverage supply chains, empty beverage containers are stored upside down by convention after they have been consumed, signalling their readiness for collection. The information collected by the optical sensor 1703 may be used on its own, or in correlation with other sensors such as accelerometers to detect the readiness of the beverage container to be returned from a venue to a brewery or collections warehouse.

That is, a disclosed smart device 1701 that secures to a beverage vessel 1705, the smart device 1701 comprising at least one proximity or distance sensor 1703 having a beam of detection with a path 1709, the sensor 1703 located and directed such the beam of detection 1709 covers a location where a coupler can be attached to the beverage vessel, the smart device being configured to determine whether the beverage container has another beverage container stacked upon it by measuring whether the path is obstructed by the another beverage container. The proximity sensor, for example, in the form of an optical sensor, may provide at least one method by which the smart device may determine its location, its state, its fill level, its rate of consumption, its orientation and/or its position in the supply chain.

The measurement is analysed further to determine the difference between having no obstruction (d1), a coupler attached (d2), having another beverage vessel 1601 stacked on top (d3), or having a flat surface against its top (d4). A smart device that secures to a beverage vessel, the smart device comprising at least one proximity sensor or distance sensor or image sensor having a beam or vision of detection with a path, the sensor located and directed such the beam of detection covers a location where a coupler can be attached to the beverage vessel, the smart device configured determine whether the beverage container has another beverage container stacked upon it by measuring whether the path is obstructed by the another beverage container.

Accordingly, the smart device of claim can be configured to provide data to analyse the difference between having no obstruction (d1), a coupler attached (d2), or having another beverage vessel stacked on top (d3), or being laid against a flat surface (d4).

It is understood that the information collected and interpreted from the optical sensor may be used on its own, or in conjunction with other sensor information gathered by the smart device in order to ascertain the status of the beverage vessel and gain insights into the age, amount and freshness of the contents within. For example, the temperature of the beverage vessel or its surrounds may be monitored to determine whether the beverage vessel has entered and or left a cool room which may signify that the beer has been connected to a draught system. This temperature data may be combined with the coupler detection data from the optical sensor to ascertain with a higher accuracy the time when the beverage has begun dispensing and may also help to infer the amount of beverage contained in the vessel.

Another example is to use the orientation of the beverage vessel along with the information from the optical coupler detection sensor to determine whether the beverage vessel is ready for collection. For example, the optical sensor may detect the connection and removal of a coupler, then it, or an accelerometer may detect that the beverage container has been placed upside down. Together these observations may indicate with a high level of certainty that the beverage container is ready for collection. This information may be further augmented with data from a GPS or other geolocation system to incorporate information about the whereabouts of the beverage container in making determinations about the freshness of its contents, its fill level and status in the supply chain. The smart device and associated data processing platform may use data collected from an internal temperature sensor to calculate the loss of freshness of its contents over time, as freshness is known to correlate with time and temperature, and this information may be combined with information about when the coupler was connected or disconnected form the beverage container in order to determine the level of freshness at the time its contents were dispensed. The information collected may be used to keep a running inventory of beverages at customers locations and may also be used with machine learning algorithms to predict the fill levels of the beverage containers based on their previous behaviour as well as predicting when to collect empty containers or dispatch new full beverage containers to customer locations. The information collected from the aforementioned one or more sensors may also be used to pre-emptively detect and alert scenarios where a shortage of beverage is about to occur at a customer site, or if a product has been pulled for sale, allowing intervention or communication to potentially prevent the loss of a long-term contract with the customer.

Figure 18:
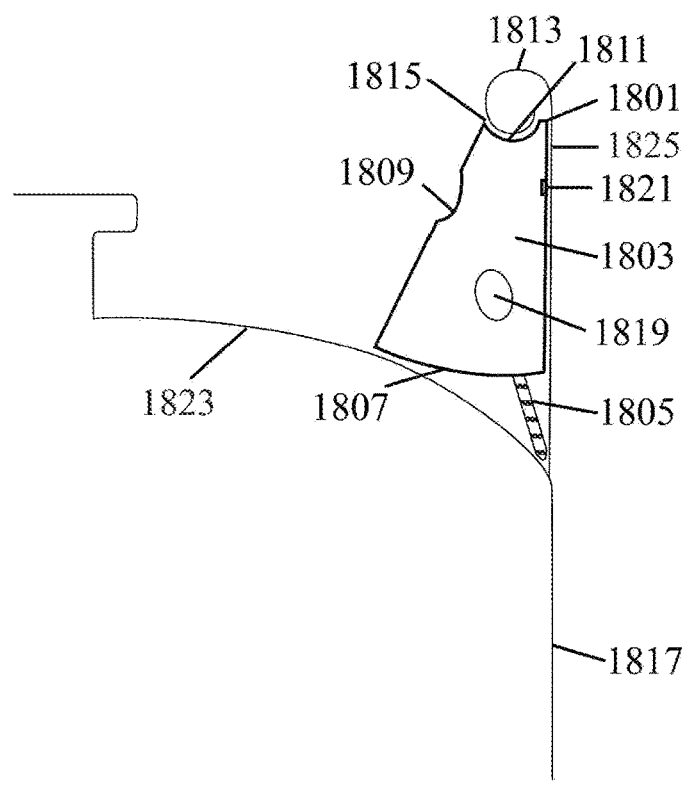
FIG. 18 depicts a cross-sectional side view of one possible embodiment of the disclosed attachable smart device housing, with a curved lower surface, mounted to a beverage container, illustrating an expanding member, a hole where the expending member can be accessed, a tongue, a recessed window or lens for an optical sensor, a window in the rear of the smart device housing, a curved upper recess in the smart device housing along with the upper domed surface, chime wall and lip of the beverage container.

FIG. 18 depicts a cross-sectional side view of one possible embodiment of the disclosed attachable smart device housing 1803, with a curved lower surface 1807, mounted to a beverage container 1817, illustrating an expanding member 1805, a hole 1819 where the expending member can be accessed, a tongue 1801, a recessed window or lens 1809 for an optical sensor, a window 1821 in the rear of the smart device housing, a curved upper recess 1811 in the smart device housing along with the upper domed surface 1823, chime wall 1825 and lip 1813 of the beverage container.

While the overall shape of the disclosed smart device housing 1803 generally follows the perimeter of the area of protection 1101 so as to maximise the available volume within the housing, a curved lower surface 1807 is illustrated, loosely following a radial path from the lip 1813 of the beverage vessel, and may allow an optimal cross-sectional area for the smart device housing 1803, that provides for a large internal volume while still being able to fit past the small aperture 11 into the cavernous area 201 depicted in FIG. 2. In one embodiment, to fit the smart device housing to the beverage container 1817, the curved lower surface 1807 can be rotated into position before the extension of expanding member 1805 for a locking fit.

Illustrated on the front surface of the enclosure is a concave, recessed window 1809 that permits and directs the beam or view of an enclosed optical sensor. The concave shape of the window 1809 may offer a level of shelter against surface scratches and impacts for the window to protect its optical properties.

Illustrated at the top of the housing is a contoured surface 1811 for increasing the sensor housing's 1803 purchase on the lip 1813 while also reducing the gap 1815 that may impede the insertion of levers which could potentially be used in malicious removal of the smart device. A tongue 1801 is illustrated and aids in attachment to beverage containers of varying diameters as previously described in FIG. 5 and a diagonal threaded fastener 1805 is illustrated as an expanding member as described earlier in FIG. 4.

A recessed cavity 1819 is illustrated which may serve to enclose the head of a fastener such as a cap or pan head screw within the perimeter of the housing, and may allow the end user to fill the cavity with a solidifying liquid or glue to prevent access to its drive head.

A rear facing window 1821 is illustrated, that may serve the purpose of allowing an internal sensor to detect the attachment or removal of the smart device housing to or from the beverage container as may be the case in the planned service lifecycle of the sensor, or in unauthorised tampering or forceful detachment from the beverage container.

Figure 19:
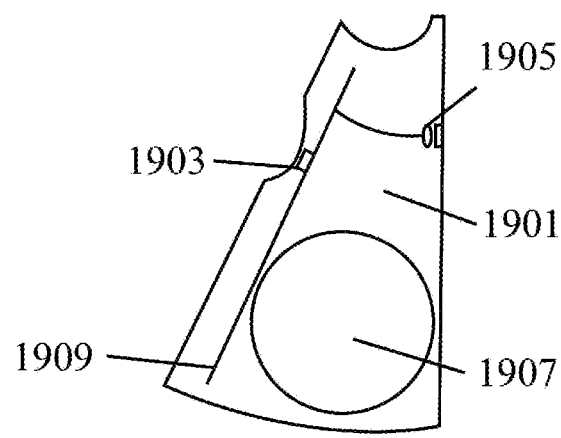
FIG. 19 depicts a cross-sectional side view of one possible embodiment of the disclosed attachable smart device housing, illustrating a circuit board, an optical sensor with a recessed window or lens at the front of the enclosure, an optical sensor and window at the rear of the enclosure and a battery.

FIG. 19 depicts a cross-sectional side view of one possible embodiment of the disclosed attachable smart device housing, illustrating a circuit board, an optical sensor with a recessed window or lens at the front of the enclosure, an optical sensor and window at the rear of the enclosure and a battery.

This illustration shows an embodiment for the layout of the smart device components within the housing 1901. A battery cell 1907 is located in the largest area of the enclosure to accommodate the largest possible cell size within the confines of the available area to extend the service life of the smart device. A circuit board 1909 is located at the front surface of the enclosure where it is distanced from the chime wall of the beverage container. This location may provide the best radiation performance for internal antennas such as GPS, WiFi, LPWAN and/or RFID antennas to transmit and receive radio signals without being impeded by the beverage container. An optical sensor 1903 which may be based on reflection, angle of incidence, time of flight or a digital vision sensor is located behind the front window of the enclosure while a through-hole light or proximity sensor 1905 is oriented near the rearward window of the enclosure to detect proximity to the wall of the beverage vessel.

Figure 20:
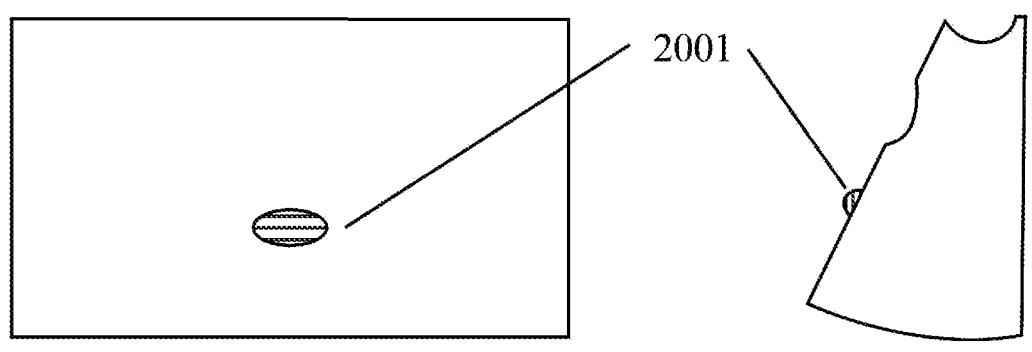
FIG. 20 depicts the front and side view of one possible embodiment of a smart device housing, featuring an optical indicator on an external surface.

FIG. 20 depicts a cross sectional side view of a smart device featuring an optical indicator 2001, located in an area that is visible to the end user when the smart device is mounted to a beverage vessel. The optical indicator configured to emit an optical signal from the smart device. The optical indicator may be triggered to illuminate permanently or intermittently by firmware running on the smart device or by processing commands sent wirelessly to the smart device.

The optical indicator may display a range of colours, light intensities and flashing sequences to convey different kinds of messages and information, and may also operate in a non-human visible spectrum such as infra-red for transmission of its signal to an electronic receiver.

The optical indicator may be used to aid in identifying the smart device or beverage container to which it is attached, amongst a plurality of smart devices or beverage containers stored in near proximity to one another. This workflow, negating the need to manually scan or search for barcodes on the smart devices or beverage containers when trying to locate a singular or plurality of beverage containers.

The operation of the optical indicator may be triggered from a user carrying a mobile phone, the user searching for specific beverage vessel(s), or could be automatically activated to signify an alert originating from its own internal sensors, such as detection of a low battery voltage, or having encountered a large impact during transit that may prompt the user to inspect the beverage vessel for damage before refilling.

Other uses for the optical indicator may include the ability to: Identify one or a plurality of beverage containers containing a particular beverage, or a particular batch of a beverage produced on a specific date; Identify which beverage containers are marked for collection; Identify when a beverage container is deemed empty or full; Identify when a beverage container should be served immediately, ahead of other beverage containers at a venue; Instruct bar staff which beverage containers to connect/disconnect from a draught dispensing system and in what order; Instruct delivery drivers which beverage containers to collect; Indicate to brewers which beverage containers have been washed and/or sanitised to help maintain order in the replenishment cycle; Indicate if beverage containers have been flagged as being damaged, before they are filled to prevent waste of beer;

The optical indicator may also be used as an alternative to RFID scanning workflows in warehouse management and logistics applications. In such cases the optical indicator may be configured to indicate where the keg is destined to be shipped to, e.g. to specific delivery zones, or for return to a brewery or back to a processing warehouse, thus allowing forklift drivers and sorting staff to easily arrange the movement of beverage vessels based on the visual signal from the optical indicator.

The smart device bearing the optical indicator may be configured to integrate into the telematics system of a delivery vehicle, such that the optical indicator may indicate to the driver which beverage containers are due to be dropped off at each specific delivery on the driver's run sheet, while also indicating to the driver which empty beverage containers have been marked for collection during the drop off/pick up visit.

In breweries and distribution warehouses, the optical indicators may be configured to indicate which beverage containers are destined for different delivery zones to aid in sorting and allocation to delivery vehicles, and they may also indicate the storage requirements for each beverage vessel such as whether they are to be stored in refrigeration.

The optical indicator may also be configured to indicate to handlers of the beverage container that there is an important pending message that the handler may need to be notified to. In this workflow, the handler would see the optical indication flashing and then by scanning the barcode on the associated beverage container or smart device, the handler may read the entirety of the detailed message or instruction that the optical indicator was signalling.

The optical indicator may also be used for the added purpose of light-based communication for near-field programming, debugging and configuration of its associated smart device. For example, the optical indicator may be configured to indicate the status of communication with the smart device and a wireless network. It may also be able to transmit a stream of data to a computerised receiver, or be paired with an optical sensor to implement a full-duplex modem for transferring data and or firmware in and out of the sensor.

The optical indicator may also be paired with an audible alarm to assist in the aforementioned workflows, alerting users to the locality of the smart device or beverage container when it has a message to display.

Figure 21:
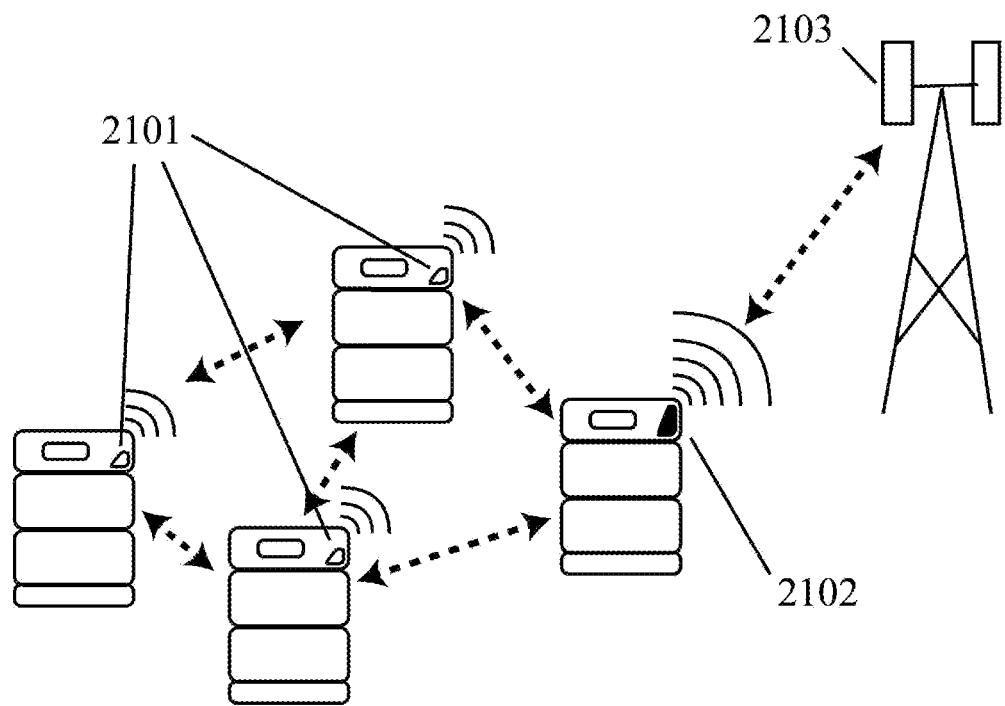
FIG. 21 depicts a hybrid network of mesh connected beverage containers, illustrating different types of smart devices and communication channels between the beverage containers and communication to an external wireless network.

FIG. 21 depicts an LPWAN (Low Power Wide Area Network) enabled mesh network of beverage vessels formed by a plurality of beverage vessels equipped with long range 2102 and short range 2101 wireless transmitting smart devices. In this topology, one or more smart devices are configured to synchronise sensor information amongst one another over short range wireless mesh networking protocols, and when information reaches a long-range-equipped smart device 2102, the information is transmitted to the cloud. In this scenario, the long range smart device 2102 transmits to a cell tower 2103. In this way, a fleet of beverage containers may be configured to transmit data to a cloud platform without incurring the cost of equipping each beverage vessel with long-range wireless transmitting capabilities.

This topology may also be altered by use of only short-range smart devices where the long-range smart devices are substituted with fixed gateways throughout the supply chain that may relay information to the cloud.

Figure 22:
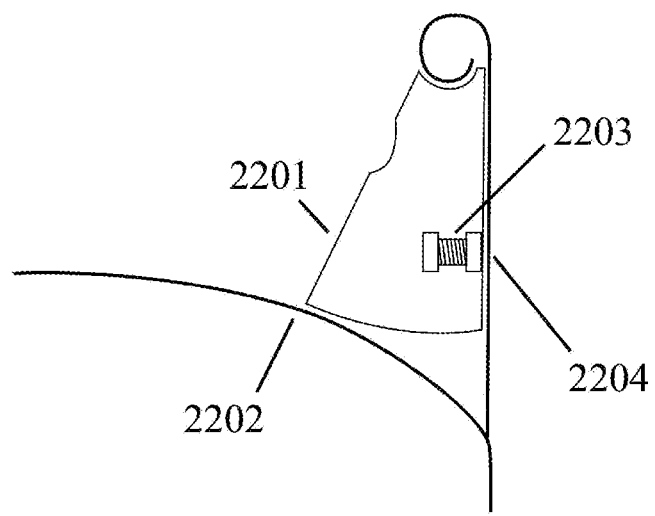
FIG. 22 depicts a cross sectional view of one embodiment of a smart device, mounted to a beverage vessel, the smart device featuring an internal inductive sensor in a close proximity to the chime of the beverage vessel.

FIG. 22 depicts a cross section of a smart device 2201 mounted to a conductive (e.g. metallic) beverage container 2202, the smart device configured to monitor its attachment to the beverage container by way of an internal inductive sensor 2203 that may be hidden inside the enclosure of the smart device. The inductive sensor configured to be located in close proximity to the chime wall 2204 or other metallic part of the beverage container such that if/when the smart device becomes detached from the beverage container, the distance between the inductive sensor and the conductive part of the beverage container changes, causing a change in the characteristics of the inductive sensor. The inductive sensor may have steady characteristics of resonance, resistance, inductance and quality (Q) in free space and be configured such that the presence of a metallic or conductive surface in near proximity (e.g. the chime wall of beverage vessel) alters these characteristics, thus indicating the smart device's attachment to the beverage vessel. The smart device may be configured to utilise this sensor as a method of tamper detection, or indication of its deployment onto a beverage vessel at the beginning of its service life. The inductive sensor may be effectively utilised without the need of conductive contacts or transparent windows in the enclosure of the smart device, therefore simplifying enclosure design, reducing possibility of liquid ingress into the enclosure and also keeping the presence of the sensor hidden to external observers such that its operation would be hard to circumvent if a malicious user were to interfere with the attachment of the sensor to the beverage vessel. The attachment status of the smart device may also be used in raising alerts from within the supply chain of the beverage container, or indicating when the smart device is detached as a part of its service schedule.

Figure 23:
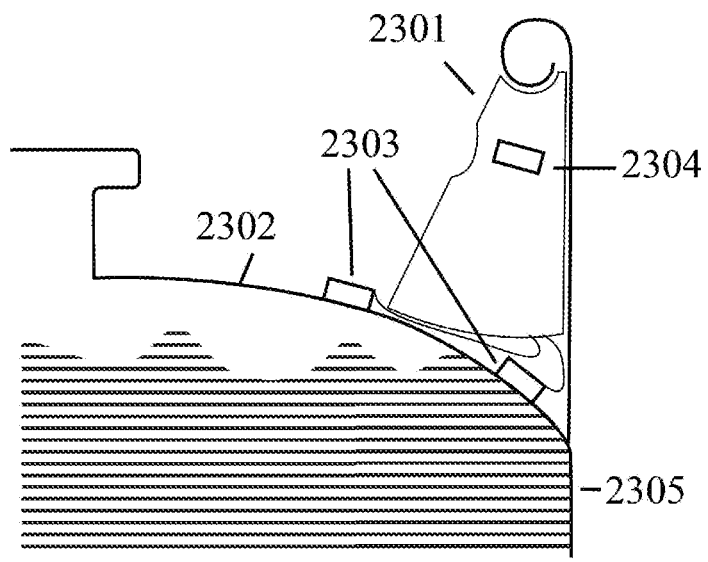
FIG. 23 depicts a cross sectional view of one possible embodiment of a smart device housing attached to a beverage vessel, along with a plurality of thermal sensors, one or more of which are mounted in contact with the beverage vessel and at least one which is separate to the beverage vessel. In the illustration this separate thermal sensor is located within the smart device housing.

FIG. 23 depicts a smart device 2301 mounted to a beverage vessel 2302, the smart device connected to a singular or plurality of thermal contact sensors 2303 mounted against the exterior of the beverage vessel in locations where an internal beverage 2305 may contact the walls of the beverage vessel. The smart device also configured to monitor temperature from an independent 2304 thermal sensor that is not in contact with the beverage vessel. In this scenario the smart device may be configured to monitor changes in the environmental temperature from its independent temperature sensor, and correlate the rate of change in environmental temperature with the rate of change in temperature detected at one or more fill levels of the beverage container. The contact sensors measuring temperature change with a lag proportional to the thermal mass of the medium they are connected to. In this way, a contact sensor located at a point below the fill level of the beverage container responds to environmental temperature changes with more time lag than one that is above the fill level as the beverage adds to the heat capacity of the medium at which the contact sensor is located. The smart device may be configured to use the detected thermal lag or comparisons between contact sensors to determine the fill level of the beverage vessel. While FIG. 23 shows only two sensors that would indicate a state of "full" or "nearly full", it is envisaged that in non-metallic beverage containers such as single-use or multi-use plastic containers, more sensors could be easily incorporated into the beverage container and therefore detecting fill levels at many more levels. Ultimately a strip of sensors could be incorporated in the walls of a plastic vessel to give a high level of resolution using the techniques aforementioned to determine fill level.

In the draught beverage supply chain, plastic caps are often attached to the top of beverage containers after they have been filled, displaying information about the beer inside, its production date and batch details. This information is often spray printed onto the beverage vessel as it is filled on an automated filling line and contributes to plastic waste.

Figure 24:
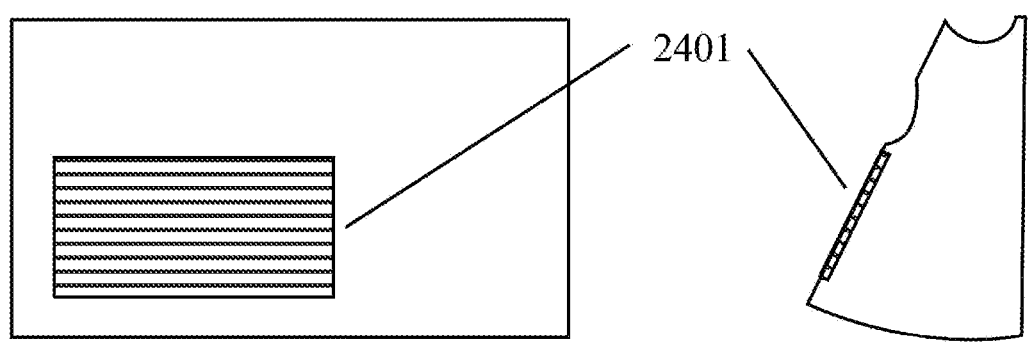
FIG. 24 depicts a front and side view of one possible embodiment of a smart device housing featuring a display screen on an external surface.

FIG. 24 depicts a smart device housing that is configured to accommodate a display screen on a surface that is visible to the end user. In the current state of the art, a display screen with e-paper technology is envisaged for its ability to maintain a static image without using power, thereby only using energy when having its contents changed, and hence maximising the life span of the smart device's batteries. The display screen may have its contents updated throughout the supply chain as a result of instructions coming wirelessly from a cloud platform, or as a response to sensor data originating from within the sensor such as low battery, or high temperature warnings. The screen may be used for the display of information pertaining to the beverage vessel, its contents or its intended use in the supply chain. The display may be used for: Showing a unique identifier, serial number or QR code for the beverage vessel or smart device; Indicating the beverage or batch information of the contents of the beverage vessel such as name, alcoholic content, production date, manufacturer; Instructions for the appropriate storage of the beverage container; Instructions for the transport of the beverage container including delivery instructions and addresses for drivers, or pickup advice; Freshness indications for the contents of the beverage vessel, including data that has been calculated locally or in the cloud, based on time and storage temperature; Advertising or promotional instructions such as live discounts to encourage putting the beverage vessel into trade; Warnings to venues not to put the beverage vessel into trade is there is a product recall on its production batch; Identifying whether the vessel is dirty, cleaned, sanitised or filled; Displaying of a QR code that may be scanned on a smart phone or tablet to display more in-depth information about the beverage container.

Figure 25:
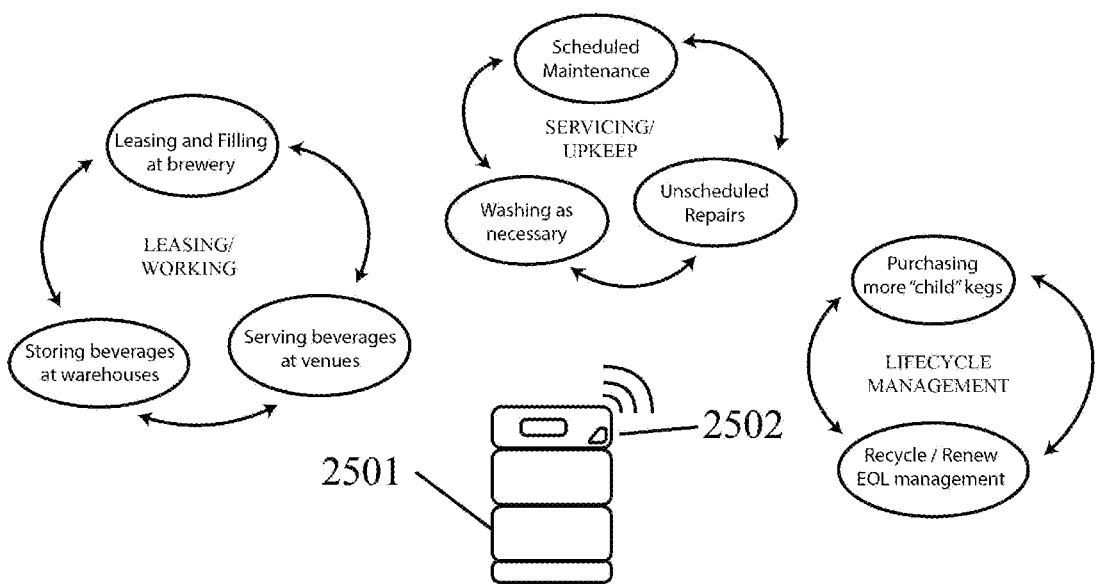
FIG. 25 depicts a beverage vessel enabled with a smart device, the diagram illustrating of a plurality of services managed by at least one smart contract, the illustrations depicting different management cycles of the commercialisation, maintenance, repair and growth of a network of smart device enabled beverage vessels.

FIG. 25 depicts a self-managed beverage vessel 2501, with a lifecycle automated by smart contracts. The vessel may be configured to make use of smart contracts to: publish its locality and availability for leasing; lease itself to customers; organise logistics with third party logistics providers and self-manage pooling to optimise costs; and organise its own scheduled maintenance, unscheduled repair and end-of-life disposal lifecycle. The self-managed beverage vessel may be configured to allocate a portion of its revenue to a "parent" body, and also to allocate a portion of its revenue to purchasing more beverage vessels to join its fleet. The self-managed beverage vessel may lease itself and pay for third party services by use of cryptocurrencies and may host its own block chain that may be centralised or decentralised across a plurality of smart devices 2502 attached to the beverage vessels themselves.

Accordingly, disclosed is a smart device housing configured to fixably attach to a beverage vessel comprising a domed surface at a distal end, the domed surface adjacent a wall terminating at a lip, the smart device housing comprising an exterior configured as a transformable shape enabling a locking fit between the lip and the domed surface of the beverage vessel.

Also disclosed is a smart device housing of the preceding clause wherein at least one dimension of the transformable shape has an initial dimension, the dimension configured for an increase in the dimension to greater than the initial dimension, for a locking fit between the lip and the domed surface of the beverage vessel.

Also disclosed is a smart device housing of a preceding clause wherein the increase in the dimension utilises at least one expanding member, the expanding member configured to be manipulated by way of at least one of compression, tension or torsional force, the expanding member being at least one of integral to the enclosure, attached to the enclosure or separate to the enclosure.

Additionally, disclosed is a smart device housing of a preceding clause wherein the at least one expanding member is at least one wedge, deploying leg, screwing cone, eccentric cam, spring clip or extendable protrusion.

Also disclosed is a smart device housing of a preceding clause wherein a plurality of beverage vessels comprises dimensional variance, wherein at least one of the expanding member is configured for a range of adjustment sufficient to overcome the dimensional variance.

Furthermore, disclosed is a smart device housing of a preceding clause wherein at least one of the expanding member is a lockable expanding member configured to be locked in a deployed state by at least one of a ratcheting mechanism, locking screw, friction, adhesive, thread locker or tortuous path.

In addition, disclosed is a smart device housing of a preceding clause whereby at least one of the lockable expanding member can be retracted or removed without damage by disengaging its locking mechanism with or without a specialised tool.

Also, disclosed is a smart device housing of a preceding clause where at least one of its dimensions is increased by addition of a viscous or malleable material, the material solidifying in situ by chemical process, thereby becoming an integral part of the attachable object forming a locking fit between the lip and the domed surface.

Furthermore, disclosed is a smart device housing of a preceding clause whereby the enclosure includes one or more protrusions or recesses allowing the viscous of malleable material to gain a mechanical purchase on the attachable object before solidifying.

Also, disclosed is a smart device housing of a preceding clause whereby at least one surface is contoured to follow the lip of the beverage vessel.

In addition, disclosed is a smart device housing of a preceding clause wherein at least one wall has a vertical height configured to be adjacent the wall with compressional force for a locking fit between the lip and domed surface of the beverage vessel.

Also, disclosed is a smart device housing of a preceding clause configured with a window or lens for a line of sight between the inside of the housing and the location where a coupler may attach to the beverage container.

Furthermore, disclosed is a smart device housing of a preceding clause configured with a window or lens, configured with a view of the presence or absence of a beverage container to which it may be attached.

Also, disclosed is a system comprising a smart device that secures to a beverage vessel, the smart device comprising at least one proximity, image or distance sensor having a beam of detection with a path, the sensor located and directed such the beam of detection covers a location where a coupler can be attached to the beverage vessel, the smart device configured to determine whether the coupler is attached to the beverage vessel by measuring whether the path is obstructed by the coupler.

Additionally, disclosed is a system of a preceding clause configured to provide data to analyse the difference between having no obstruction, a coupler attached, having another beverage vessel stacked on top.

Furthermore, disclosed is a system of a preceding clause configured to determine the consumption time and rate of consumption of the beverage.

Additionally, disclosed is a system of a preceding clause configured to determine whether the vessel is empty and ready for collection.

Furthermore, disclosed is a system of a preceding clause configured to ascertain the freshness and time to consumer of beverages at time of consumption.

Additionally, disclosed is a method of determining the fill status of a beverage container from at least one of the orientation, the temperature history, movement patterns, and presence or timing of attachment and/or detachment of a coupler to the beverage container.

Also, disclosed is a method of a preceding clause comprising a smart device comprising at least one proximity, image or distance sensor having a beam of detection with a path, the sensor locating and directing such the beam of detection so that the beam covers a location where the coupler can be attached to the beverage vessel, the smart device configured to determine whether the coupler is attached to the beverage vessel by measuring whether the path is obstructed by the coupler.

While a smart device housed in the disclosed smart device housing may include any number of features for sensing, recording, transmitting, beaconing and identifying information about its beverage container, the container's contents or the surrounding environment, this description also describes a means of detecting when a beverage container is connected with a draught system. This information can be used for tracking of beverage consumption rates and times, reporting sales activity, determining the freshness of the beverage at time of sale, managing automatic replenishment of empty containers, automating in-field stocktakes, planning for brewing/production schedules or optimising the logistics for returning empty beverage containers sooner. As discussed, the smart device housing may also enclose an optical sensor, oriented to face towards the location where a coupler is usually attached to the beverage container as a means to detect when the contents of the beverage container is being consumed (e.g. when a beer keg is tapped and connected to a draught system), providing information that can be used to determine the rate and time of consumption, the freshness of the beverage at time of consumption or the readiness for the beverage container to be collected once it is empty and detached from a draught system.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) was chosen and described to provide the best illustration of the principle of the described technology and its practical application, and to enable one of ordinary skill in the art to utilize the technology in various embodiments and with various modifications as are suited to the particular use contemplated. Devices, systems, methods of working, methods of manufacture, and various other configurations are within the scope of this disclosure. All such modifications and variations are within the scope of the invention as determined by the appended claims, as may be amended during the pendency of this application for patent, and all equivalents thereof, when interpreted in accordance with the breadth to which they are fairly, legally and equitably entitled.

What is claimed is:

1. A smart device housing configured to securely attach to a beer keg comprising a domed surface at a distal end, the domed surface adjacent a vertical wall terminating at a lip, the smart device housing comprising:
   a transformable shape of an initial vertical size and an initial vertical dimension so that the smart device housing loosely fits between the lip and the domed surface, the transformable shape being configured to enable a size change from the initial vertical size to a greater locking fit size and the transformable shape being configured to enable a dimension change from the initial vertical dimension to a greater locking fit dimension, the size change and the dimension change to provide a locking fit between the lip and the domed surface of the beer keg to the smart device housing.

2. The smart device housing of claim 1 wherein the change in the dimension is an increase in the dimension that utilises at least one expanding member, the expanding member configured to be manipulated by way of at least one of compression, tension or torsional force, the expanding member being at least one of integral to the housing, attached to the housing or separate to the housing.

3. The smart device housing of claim 1 wherein the change in the size is an increase in the size that utilises at least one expanding member, the expanding member configured to be manipulated by way of at least one of compression, tension or torsional force the expanding member being at least one of integral to the housing, attached to the housing or separate to the housing.

4. The smart device housing of claim 2 wherein the at least one expanding member is at least one wedge, deploying leg, screwing cone, eccentric cam, spring clip or extendable protrusion.

5. The smart device housing of claim 2 wherein a plurality of beer kegs includes dimensional variances, wherein at least one of the expanding member is configured for a range of adjustment sufficient to overcome the dimensional variances.

6. The smart device housing of claim 2 wherein a plurality of beer kegs include size variances, wherein at least one of the expanding member is configured for a range of adjustment sufficient to overcome the size variances.

7. The smart device housing of claim 2 wherein at least one of the expanding member is a lockable expanding member configured to be locked in a deployed state by at least one of a ratcheting mechanism, locking screw, friction, thread locker or tortuous path.

8. The smart device housing of claim 7 whereby at least one of the lockable expanding member can be retracted or removed without damage by disengaging smart device housing locking mechanism with or without a specialised tool.

9. The smart device housing of claim 1 whereby at least one surface is contoured to follow the lip of the beer keg.

10. The smart device housing of claim 1 comprising at least one wall that has a vertical height configured to be adjacent the vertical wall of the beer keg with compressional force for a locking fit between the lip and domed surface of the beer keg.

11. The smart device housing of claim 1 configured with a window or lens for a line of sight between the inside of the housing and the location where a coupler may attach to the beer keg.

12. The smart device housing of claim 1 configured with a window or lens, configured with a view of the presence or absence of a beer keg to which the smart device may be attached.

* * * * *